(12) United States Patent
Stamoulis et al.

(10) Patent No.: US 8,458,345 B2
(45) Date of Patent: Jun. 4, 2013

(54) METHOD AND APPARATUS FOR FREQUENCY REUSE IN A MULTI-CARRIER COMMUNICATIONS SYSTEM

(75) Inventors: Anastasios Stamoulis, San Diego, CA (US); Rajarshi Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 12/111,073

(22) Filed: Apr. 28, 2008

(65) Prior Publication Data

US 2009/0228598 A1 Sep. 10, 2009

Related U.S. Application Data

(60) Provisional application No. 61/034,576, filed on Mar. 7, 2008.

(51) Int. Cl.
*G06F 15/16* (2006.01)
*G06F 12/00* (2006.01)

(52) U.S. Cl.
USPC ........................................................ 709/229

(58) Field of Classification Search
USPC ................ 709/217–219, 223–230, 246, 250
See application file for complete search history.

(56) References Cited

U.S. PATENT DOCUMENTS

| | | | |
|---|---|---|---|
| 2004/0160914 A1 | 8/2004 | Sarkar | |
| 2007/0105574 A1* | 5/2007 | Gupta et al. | 455/509 |
| 2007/0105575 A1* | 5/2007 | Sampath et al. | 455/509 |
| 2007/0105576 A1* | 5/2007 | Gupta et al. | 455/509 |
| 2008/0031172 A1* | 2/2008 | Nanda et al. | 370/310.1 |
| 2009/0175324 A1* | 7/2009 | Sampath et al. | 375/222 |
| 2010/0075689 A1 | 3/2010 | Uemura et al. | |

FOREIGN PATENT DOCUMENTS

| | | |
|---|---|---|
| JP | 2009514444 | 4/2009 |
| JP | 4431630 B2 | 3/2010 |
| RU | 2322764 | 4/2008 |
| WO | WO2005079027 A1 | 8/2005 |
| WO | WO2007051152 | 5/2007 |
| WO | WO2008093621 A1 | 8/2008 |

OTHER PUBLICATIONS

International Search Report and Written Opinion—PCT/US2008/061910, International Search Authority—European Patent Office—Mar. 20, 2009.
Taiwan Search Report—TW097123537—TIPO—Mar. 6, 2012.

* cited by examiner

*Primary Examiner* — Zarni Maung
(74) *Attorney, Agent, or Firm* — Nicholas J. Pauley; Peter Michael Kamarchik; Joseph Agusta

(57) ABSTRACT

Systems and methods are described that facilitate evaluating conditions of nodes (e.g., access points, access points, access terminals, etc.) in a wireless communication environment having a plurality of carriers to determine a level of disadvantage for a given node relative to other nodes. The node may transmit a resource utilization message (RUM) that represents the level of disadvantage for the node and request other interference nodes to back off on one or more carriers. This would allow frequency reuse if nodes vary the power of transmission for particular carriers, in conjunction with neighboring nodes.

38 Claims, 19 Drawing Sheets

| SLOT 1110 | CM Priority 1120 | # of Channels 1130 | Resulting CM [3\|2\|1\|0] 1140 |
|---|---|---|---|
| 1 _1112_ | 3, 2, 1, 0 _1122_ | 2 _1132_ | 1 1 0 0 _1142_ |
| 2 _1114_ | 0, 2, 3, 1 _1124_ | 3 _1134_ | 1 1 0 1 _1144_ |
| 3 _1116_ | 2, 1, 0, 3 _1126_ | 1 _1136_ | 0 1 0 0 _1146_ |
| 4 _1118_ | 2, 0, 1, 3 _1128_ | 0 _1138_ | 0 0 0 0 _1148_ |

METHOD AND APPARATUS FOR FREQUENCY REUSE IN A MULTI-CARRIER COMMUNICATIONS SYSTEM

CLAIM OF PRIORITY UNDER 35 U.S.C. §119

The present application for patent claims priority to Provisional Application No. 61/034,576, entitled "SPECIFYING RESOURCES FOR MULTI RESOURCE COMMUNICATION" filed on Mar. 7, 2008, and assigned to the assignee hereof and hereby expressly incorporated by reference herein.

BACKGROUND

I. Field

The following description relates generally to wireless communications, and more particularly to reducing interference and improving throughput and channel quality in a wireless communication environment.

II. Background

Wireless communication systems have become a prevalent means by which a majority of people worldwide communicate. Wireless communication devices have become smaller and more powerful in order to meet consumer needs and to improve portability and convenience. The increase in processing power in mobile devices such as cellular telephones has led to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

A typical wireless communication network (e.g., employing frequency, time, and code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal. Such communication between base station and mobile terminal or between mobile terminals can be degraded due to channel variations and/or interference power variations. Accordingly, a need in the art exists for systems and/or methodologies that facilitate reducing interference and improving throughput in a wireless communication environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to various aspects, the subject innovation relates to systems and/or methods that provide unified technology for wide and local wireless communication networks in order to facilitate achieving benefits associated with both cellular and Wi-Fi technologies while mitigating drawbacks associated therewith. For instance, cellular networks may be arranged according to a planned deployment, which can increase efficiency when designing or building a network, while Wi-Fi networks are typically deployed in a more convenient, ad hoc manner. Wi-Fi networks may additionally facilitate providing a symmetrical medium access control (MAC) channel for access points and access terminals, as well as backhaul support with in-band wireless capability, which are not provided by cellular systems.

The unified technologies described herein facilitate deploying the network in a flexible manner. The methods described in this disclosure allow the performance to adapt according to the deployment, thus providing good efficiency if the deployment is planned or semi-planned, and providing adequate robustness if the network is unplanned. That is, various aspects described herein permit a network to be deployed using a planned deployment, (e.g., as in a cellular deployment scenario), an ad hoc deployment (e.g., such as may be utilized for a Wi-Fi network deployment), or a combination of the two. Still furthermore, other aspects relate to supporting nodes with varied transmission power levels and achieving inter-cell fairness with regard to resource allocation, which aspects are not adequately supported by Wi-Fi or cellular systems.

For example, according to some aspects, weighted fair-sharing of a set of wireless carriers may be facilitated by joint scheduling of a transmission by both a transmitter and a receiver using a resource utilization message (RUM), whereby a transmitter requests a set of resources based on knowledge of availability in its neighborhood, and a receiver grants a subset of the requested carriers based on knowledge of availability in its neighborhood. The transmitter learns of availability based on listening to receivers in its vicinity and the receiver learns of potential interference by listening to transmitters in its vicinity. According to related aspects, RUMs may be weighted to indicate not only that a node receiving data transmissions is disadvantaged (due to the interference it sees while receiving) and desires a collision avoidance mode of transmission, but also the degree to which the node is disadvantaged. An RUM-receiving node may utilize the fact that it has received an RUM, as well as the weight thereof, to determine an appropriate response. As an example, such an advertisement of weights enables collision avoidance in a fair manner. This disclosure describes such a methodology.

According to a related aspect, an RUM sending node may indicate its degree of disadvantage by indicating a number of carriers for which the RUM applies, such that the number of carriers (in general, these could be resources, channels, frequency carriers/sub-carriers and/or time slots) is indicative of the degree of disadvantage. If the degree of disadvantage is reduced in response to the RUM, then the number of carriers for which the RUM is sent may be reduced for a subsequent RUM transmission. If the degree of disadvantage is not reduced, then the number of carriers for which the RUM applies may be increased for a subsequent RUM transmission.

An RUM may be sent at a constant power spectral density (PSD), and a receiving node may employ the received power spectral density and/or received power of the RUM to estimate a radio frequency (RF) channel gain between itself and the RUM sending node to determine whether it will cause interference at the sending node (e.g., above a predetermined acceptable threshold level) if it transmits. Thus, there may be situations wherein an RUM receiving node is able to decode the RUM from the RUM sending node, but determines that the RUM receiving node will not cause interference. When an RUM-receiving node determines that it should obey the RUM, it can do so by choosing to backoff from that resource completely or by choosing to use a sufficiently reduced transmit power bring its estimated potential interference level below the predetermined acceptable threshold level. Thus, "hard" interference avoidance (complete backoff) and "soft" interference avoidance (power control) are both supported in a unified manner. According to a related aspect, the RUM may be employed by the receiving node to determine a channel gain between the receiving node and the RUM-sending node in order to facilitate a determination of whether or not to transmit based on estimated interference caused at the sending node.

In the power control interference avoidance approach, nodes, such as access points, can be organized in a way to use the same set of carriers to serve associated nodes, such as access terminals, close to them with a low transmission power. The rest of the carriers are used with a higher transmission power and can be used by both distant and close associated nodes. To minimize interference of high power carriers for clients of neighboring nodes, such as access points, the cells comprised of a node and its associated nodes are further organized in a way that two adjacent cells do not use the same high power carriers. Thus, distant associated terminals of a node will not see the high power carriers of neighboring nodes as interference. This approach is also referred to as the flexible bandwidth, or flexband, approach.

According to an aspect, a method for communicating data may include receiving at least one RUM related to a plurality of resources; determining a transmission profile for at least one resource of the plurality of resources based on the at least one RUM; and scheduling a transmission on the at least one resource based on the transmission profile.

Another aspect relates to an apparatus for communicating data, including means for receiving at least one RUM related to a plurality of resources; means for determining a transmission profile for at least one resource of the plurality of resources based on the at least one RUM; and means for scheduling a transmission on the at least one resource based on the transmission profile.

Another aspect relates to an access point having an antenna and a processing system coupled to the antenna. The processing system is configured to receive at least one RUM related to a plurality of resources via the antenna; determine a transmission profile for at least one resource of the plurality of resources based on the at least one RUM; and, schedule a transmission on the at least one resource based on the transmission profile.

Another aspect relates to an access terminal having a transducer and a processing system coupled to the transducer. The processing system is configured to receive at least one RUM related to a plurality of resources usable to communicate data usable with the transducer; determine a transmission profile for at least one resource of the plurality of resources based on the at least one RUM; and, schedule a transmission on the at least one resource based on the transmission profile.

Another aspect relates to a computer program product for communicating data having a computer readable medium having codes executable to receive at least one RUM related to a plurality of resources; determine a transmission profile for at least one resource of the plurality of resources based on the at least one RUM; and schedule a transmission on the at least one resource based on the transmission profile.

Another aspect relates to an apparatus for communicating data having a processing system. The processing system is configured to receive at least one RUM related to a plurality of resources; determine a transmission profile for at least one resource of the plurality of resources based on the at least one RUM; and schedule a transmission on the at least one resource based on the transmission profile.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIG. 11 is a diagram for illustrating the operation of the pseudorandom carrier selection process of FIG. 10.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Moreover, references to a list of elements comprising of "at least one of A, B and C" should be interpreted to reference each of the elements A, B, and C individually, as well as any combinations of the elements A, B and C. Further, also the description utilizes a network that involves the IEEE 802.11 standard, networks that utilize other protocols may benefit from the various techniques and systems disclosed herein.

It will be understood that a "node," as used herein, may be an access terminal or an access point, and that each node may be a receiving node as well as a transmitting node. For example, each node may comprise at least one receive antenna and associated receiver chain, as well as at least one transmit antenna and associated transmit chain. Moreover, each node may comprise one or more processors to execute software code for performing any and all of the methods and/or protocols described herein, as well as memory for storing data and/or computer-executable instructions associated with the various methods and/or protocols described herein.

Figure 1:
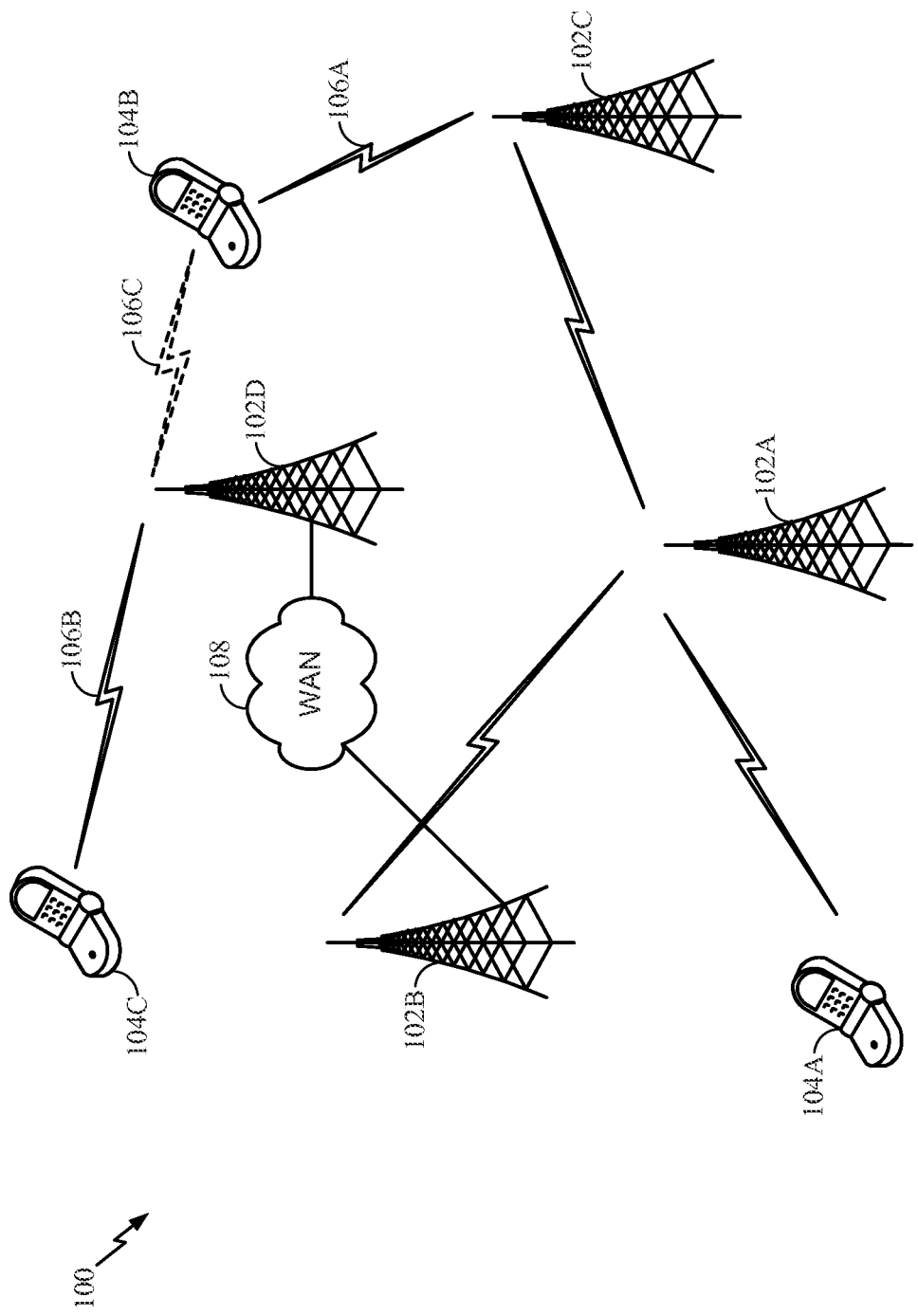
FIG. 1 is a network diagram of an exemplary wireless communication system with multiple access points and multiple access terminals such as may be utilized in conjunction with one or more aspects of a methodology for managing interference by employing a resource utilization message (RUM).

FIG. 1 illustrates several sample aspects of a wireless communication system 100. The system 100 includes several wireless nodes, generally designated as nodes 102 and 104. A given node may receive and/or transmit one or more traffic flows (e.g., data flows). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, a relay point, or an access point. Referring to FIG. 1, the nodes 102 may comprise access points or relay points and the nodes 104 may comprise access terminals. In some implementations the nodes 102 facilitate communication between the nodes of a network (e.g., a Wi-Fi network, a cellular network, or a WiMAX network). For example, when an access terminal (e.g., an access terminal 104A) is within a coverage area of an access point (e.g., an access point 102A) or a relay point, the access terminal 104A may thereby communicate with another device of the system 100 or some other network that is coupled to communicate with the system 100. Here, one or more of the nodes (e.g., nodes 102B and 102D) may comprise a wired access point that provides connectivity to another network or networks (e.g., a wide area network 108 such as the Internet).

In some aspects two or more nodes of the system 100 (e.g., nodes of a common independent service set) associate with one another to establish traffic flows between the nodes via one or more communication links. For example, the nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some cases, several nodes in the system 100 may attempt to transmit at the same time (e.g., during the same time slot). Depending on the relative locations of the transmitting and receiving nodes and the transmit power of the transmitting nodes, it may not be possible to reliably conduct such concurrent communications. Under these circumstances, the wireless resources of the system 100 may be well utilized as compared to, for example, a system that simply uses a carrier sense multiple access ("CSMA") mode of operation.

Under other circumstances, however, wireless transmissions from a node in the system 100 may interfere with reception at a non-associated node in the system 100. For example, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power of the node 102D, transmissions from the node 102D (as represented by a dashed symbol 106C) may interfere with reception at the node 104B. In a similar manner, transmissions from the node 104B may interfere with reception at the node 102D depending on the transmission power of the node 104B.

To mitigate interference such as this, the nodes of a wireless communication system may employ an inter-node messaging scheme. For example, a receiving node that is experiencing interference may transmit a resource utilization message (RUM) to indicate that the node is disadvantaged in some way. A neighboring node, which may be a potential interferer, that receives the RUM may elect to limit its future transmissions in some way to avoid interfering with the RUM-sending node—that is, the receiving node that sent the RUM. Here, a decision by a receiving node to transmit a RUM may be based, at least in part, on quality of service associated with data received at that node.

Request messages, grant messages, and data transmissions may be power controlled: however, a node may nonetheless experience excessive interference that causes its signal-to-interference noise (SINR) levels to be unacceptable. In order to mitigate undesirably low SINR, RUMs may be utilized. An RUM may be broadcast by a receiver when interference levels on the receiver's desired carriers exceed a predetermined threshold level. As discussed herein, in an aspect of the deployment of RUMs, an RUM is sent out by a receiving node when it is unable to meet its quality of service (QoS) requirements. The QoS requirements may be predetermined and may be expressed in the form of throughput (e.g., for full buffer traffic), latency (e.g., for voice traffic), average spectral efficiency, minimum carrier-to-interference (C/I) ratio, or other suitable metrics. The RUM encapsulates the weight, which signifies the degree of disadvantage faced by the node that is transmitting the RUM. In other words, in an aspect of the use of the weight, the degree of disadvantage is a function of the node's QoS and its desired QoS. This RUM weight may be quantized using a predetermined number of bits.

"Disadvantage," as used herein, may be determined as a function of, for instance, a ratio of a target value to an actual value for a given node. For example, when disadvantage is measured as a function of throughput, spectral efficiency, data rate, or some other parameter where higher values are desirable, then when the node is disadvantaged, the actual value will be relatively lower than the target value. In such cases, a weighted value indicative of the level of disadvantage of the node may be a function of the ratio of the target value to the actual value. In cases where the parameter based upon which disadvantage is based is desired to be low (e.g., latency), a reciprocal of the ratio of the target value to the actual value may be utilized to generate the weight. As used herein, a node that is described as having a "better" condition relative to another node may be understood to have a lesser level of disadvantage (e.g., the node with the better condition has less interference, less latency, a higher data rate, higher throughput, higher spectral efficiency, etc., than another node to which it is compared).

Using RUMs, a receiving node (such as an access point) can block interfering nodes that cause it too much interference. In other words, the receiving node can request other nodes from transmitting on the carrier. In network designs where the bandwidth contains only one carrier, when an RUM is sent by a receiving node, the whole bandwidth is blocked for its intended access terminal. With a multicarrier communication system, in which the available bandwidth is divided into separate portions—each of which is referred to as a carrier or channel; only certain carriers may be blocked so that the receiving node may still achieve its desired throughput while limiting the impact on the rest of the system.

For example, the available bandwidth in a multicarrier communication system may be divided into four (4) carriers. Each transmitting node may then be scheduled to transmit over one (1) or more carriers, thereby allowing better sharing of the resources. In order to ensure that interference avoidance happens in a fair manner—that is, to ensure that all nodes get a fair share of transmission opportunities, the RUM may contain a list of carriers upon which a receiving node desires reduced interference, as well as the aforementioned weight information, as described herein. The weight of a given receiving node can be utilized to calculate the fair share of resources for allocation to the node.

Figure 2:
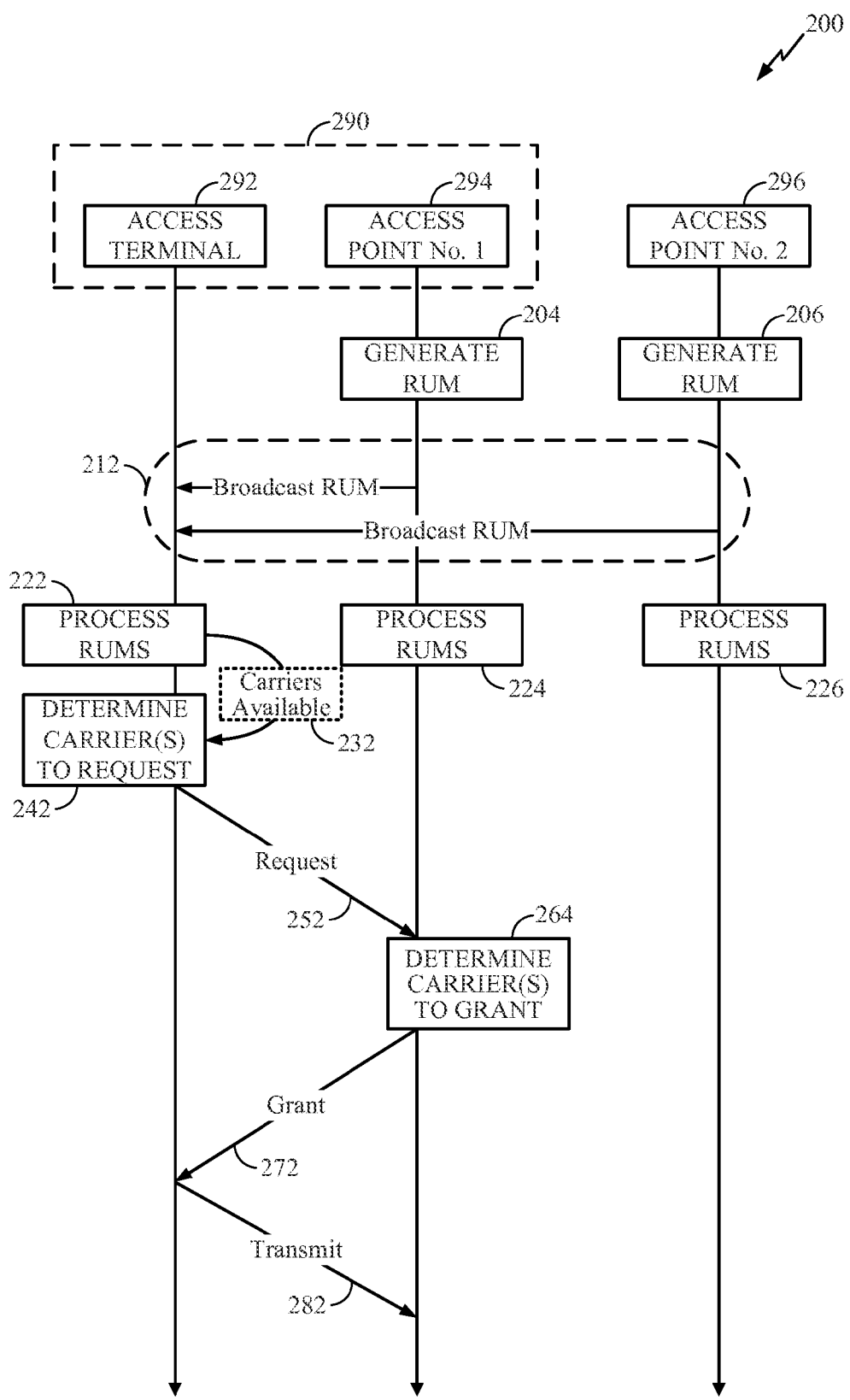
FIG. 2 is a process diagram for a sequence of request-grant events that can facilitate resource allocation, in accordance with one or more aspects described herein.

FIG. 2 illustrates an exemplary request-grant events sequence 200 that involves the use of RUMs to facilitate resource allocation, in accordance with one or more aspects described herein. In the example shown in the figure, an associated pair of nodes 290 includes an access terminal 292 and a first access point 1 294, as well as a second access point 2 296 that is unassociated with the associated pair of nodes 290.

The sequence 200 starts with 204 and 206, during which the access point 1 294 and the access point 2 296 each generates an RUM to be broadcast to other nodes, including access terminal 292. The RUM includes a weight that indicates how disadvantaged the access points are as well as which carriers over which the access point wishes to block other nodes from transmitting, as further described herein with reference to FIG. 3.

In 212, the access point 1 294 and the access point 2 296 broadcasts their respective RUM to nodes such as access terminal 292.

In 222, the access terminal 292 processes all RUMs received in 212. The RUM processing that is performed by the access terminal 292 is described herein with reference to FIG. 7.

In 232, if the access terminal 292 determines there are carriers available after processing the received RUMs, then it will determine the carriers for which it wishes to send a request to transmit upon from the access point 1 294 in 242.

In 252, a request to transmit is sent from the access terminal 292 to the access point 1 294. The request can include a list of carriers over which the access terminal 292 would like to transmit data. The sequence of events 200 may be performed in view of a plurality of constraints that may be enforced during a communication event. For example, the access terminal 292 may request any carrier(s) that have not been blocked by an RUM in a previous time slot. The requested carriers may be prioritized with a preference for a successful carrier in a most recent transmission cycle.

In 264, the access point 1 294 determines the carriers that it will grant the access terminal 292 to transmit over based on the request received from the access terminal 292. The grant could include all or a subset of the requested carriers. Thus, the grant from the access point 1 294 may be a subset of the carriers listed in the request sent by the access terminal 292. The access point 1 294 can be endowed with authority to avoid carriers exhibiting high interference levels during a most recent transmission.

In 272, the access point 1 294 may then send a grant message to the access terminal 292, which indicates that all or a subset of the requested carriers have been granted.

In 282, the access terminal 292 may then transmit a pilot message to the access point 1 294, upon receipt of which the access point 1 294 may transmit rate information back to the access terminal 292, to facilitate mitigating an undesirably low SINR. Upon receipt of the rate information, the access terminal 292 may proceed with data transmission over the granted carriers and at the indicated transmission rate. Further, when transmitting, the access terminal 292 may send data over the all or a subset of carriers granted in the grant message. The access terminal 292 may reduce transmission power on some or all carriers during its transmission of data.

Figure 3:
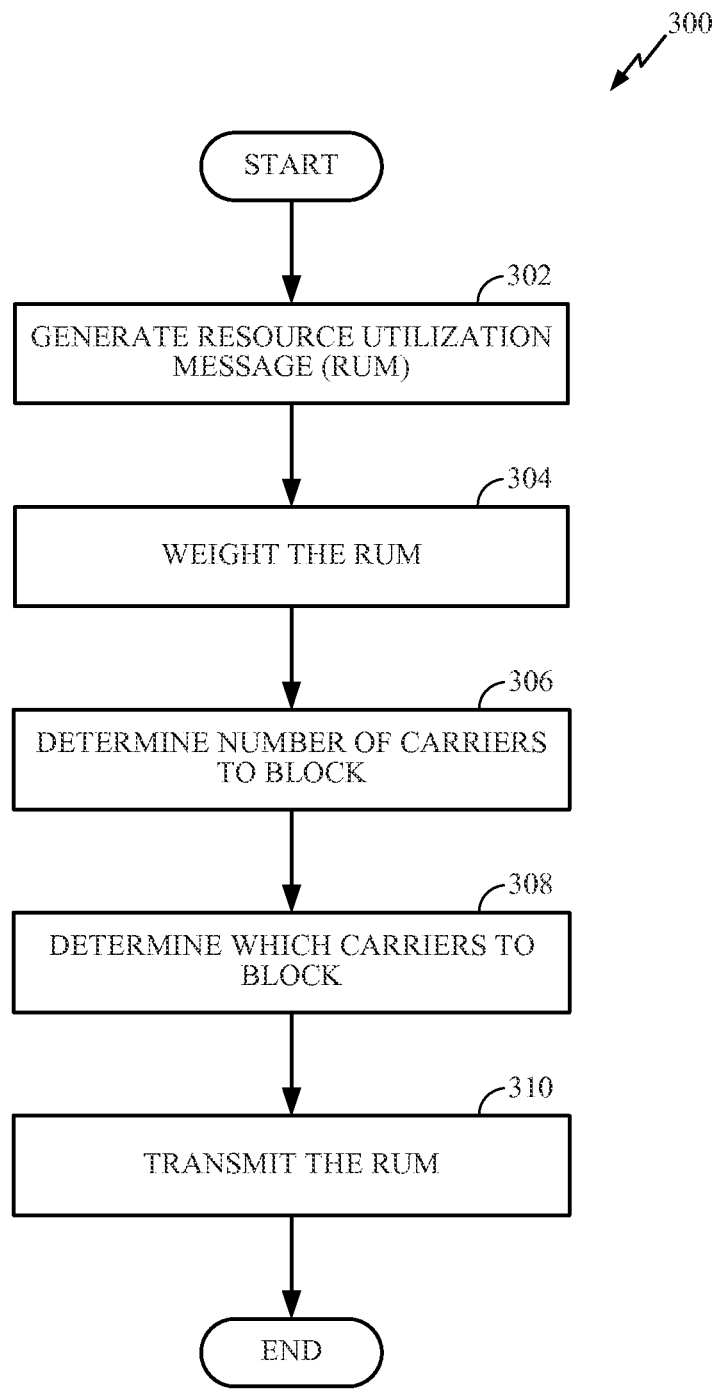
FIG. 3 is a flow diagram of an exemplary methodology for generating an RUM.

FIG. 3 is an illustration of a methodology 300 that for generating an RUM in a multi-carrier system, in accordance with various aspects described above. The methodology for achieving fairness among contending nodes is performed by adjusting a number of carriers for which to transmit an RUM according to a level of disadvantage associated with a given node, in accordance with one or more aspects. As described herein, an RUM is sent out by a receiving node such as an access point to indicate that it is experiencing poor communication conditions and wants a reduction in the interference it faces. The RUM includes a weight that quantifies the degree of disadvantage that the node is experiencing. According to an aspect, the weight may be set as a function of a threshold referred to as the RUM sending threshold (RST). In another aspect, the weight may be set to the average throughput. Here, RST is the average throughput that the node desires. When a transmitting node such as an access terminal hears multiple RUMs, it may utilize respective weights to resolve the contention between them. If, for example, an access terminal receives multiple RUMs and the RUM with the highest weight originated from the access terminal's own access point, then it may decide to transmit a request to send data to its access point. If not, the access terminal may refrain from transmitting.

The RUM allows an access point to clear interference in its immediate neighborhood because the nodes that receive the RUM may be induced to refrain from transmitting. While weights allow for a fair contention (e.g., an access point with the greatest disadvantage wins), having a multi-carrier MAC may provide another degree of freedom. Specifically, when a system supports multiple carriers, the RUM may carry a CM (i.e., bitmask) in addition to the weight. The CM indicates the carriers on which this RUM is applicable. The number of carriers for which an access point may send RUMs may be based on its degree of disadvantage to allow nodes with very poor history to catch up more rapidly. When the RUMs are successful and the transmission rate received by the access point in response thereto improves its condition, the access point may reduce the number of carriers for which it sends RUMs. If, due to heavy congestion, the RUMs do not succeed initially and throughput does not improve, the access point may increase the number of carriers for which it sends RUMs. In a very congested situation, a access point may become highly disadvantaged and may send RUMs for all carriers, thereby degenerating to the single carrier case.

At 302, a level of disadvantage may be determined for an access point and an RUM may be generated to indicate the level of disadvantage to other nodes within "listening" range (i.e., whether they send data to the access point or not), wherein the RUM comprises information that indicates that a first predetermined threshold has been met or exceeded. The first predetermined threshold may represent, for instance, a level of interference over thermal noise (IOT), a data rate, a C/I ratio, a level of throughput, a level of spectral efficiency, a level of latency, or any other suitable measure by which a service at the first node may be measured.

At 304, the RUM may be weighted in order to indicate a degree to which a second predetermined threshold has been exceeded. The second predetermined threshold may represent for instance, a level of IOT noise, a data rate, a C/I ratio, a level of throughput, a level of spectral efficiency, a level of latency, or any other suitable measure by which a level of service at the first node may be measured. According to some aspects, the weight value may be a quantized value. Although the first and second predetermined thresholds may be substantially equal, they need not be.

The weight information carried in each RUM is intended to convey to all nodes within listening range the degree to which the access point has been starved for bandwidth due to interference from other transmissions. The weight may represent a degree of disadvantage and may be larger when the access point has been more disadvantaged and smaller when less disadvantaged. The degree of disadvantage may be derived using a variety of factors. As an example, if throughput is used to measure the degree of disadvantage, then one possible relationship may be represented as:

$$RUM\ Weight = Q\left(\frac{R_{target}}{R_{actual}}\right)$$

where $R_{target}$ represents the desired throughput, $R_{actual}$ is the actual throughput being achieved, and $Q(x)$ represents the quantized value of x. When there is a single flow at the access point, then $R_{target}$ may represent the minimum desired throughput for that flow, and $R_{actual}$ may represent the average throughput that has been achieved for that flow. Note that higher value weights representing a greater degree of disadvantage is a matter of convention. As an example, assuming that a desired throughput for a node is 500 kbps. However, the node only achieves an actual throughput of 250 kbps. In this case, the weight may be calculated based on the node needing twice the current amount of throughput (500 kbps/250 kbps=2) to reach the desired throughput.

In a similar manner, a convention where higher value weights represent lower degree of disadvantage may be utilized as long as the weight resolution logic is appropriately modified. For example, one could use the ratio of actual throughput to target throughput (the inverse of the example shown above) to calculate the weights. Thus, using the above values, the ratio would be 250 kbps/500 kbps, which would be ½, or 50% of the targeted throughput.

When there are multiple flows at the access point, with potentially different $R_{target}$ values, then the access point may choose to set the weight based on the most disadvantaged flow. For example:

$$RUM\ Weight = Q\left(\max_j \left(\frac{R_{target}^j}{R_{actual}^j}\right)\right)$$

where j is the flow index at the access point. Other options, such as basing the weight on the sum of the flow throughput, may be performed as well. Note that the functional forms used for the weights in the above description are purely for illustration. The weight may be calculated in a variety of different manners and using different metrics other than throughputs. According to a related aspect, the access point can determine whether it has data outstanding from a sender (e.g., a transmitter). This is true if it has received a request, or if it has received a prior request that it has not granted. In this case, the access point can send out an RUM when $F_{actual}$ is below $R_{target}$.

Further, the weight may be normalized with respect to a maximum and minimum value. For example, the weight may be normalized to be a value between 0 and 1. The normalized values may be determined based on the received RUM weights, with the highest received RUM weight being set to the value of 1, while the lowest received RUM weight being set to the value of 0.

An additional dimension for collision avoidance can be realized if a list of carriers in the RUM over which the node desires to reduce interference is included along with the weight in an RUM, which may be useful when a receiving node such as an access point needs to schedule the receipt of a small amount of data over a part of the channel and does not want other nodes to back off from the entire channel. The list of carriers may be implemented with a bitmask that contains information about which carriers the access point would like to reduce interference. When each RUM is augmented with the bitmask—also referred to herein as a carrier mask (CM), a node may reduce interference from its neighboring nodes (e.g., access points or access terminals) over a subset of carriers, rather than all the carriers. This aspect may provide finer granularity in the collision avoidance mechanism, which may be important for bursty traffic. Further, the CM may also be used in the generation of requests to transmit by an access terminal in requesting a portion of the channel, as well as the generation of grants to the request by an access point in responding to the requests (e.g., the response may be the grant of a portion of the channel).

Figure 4:
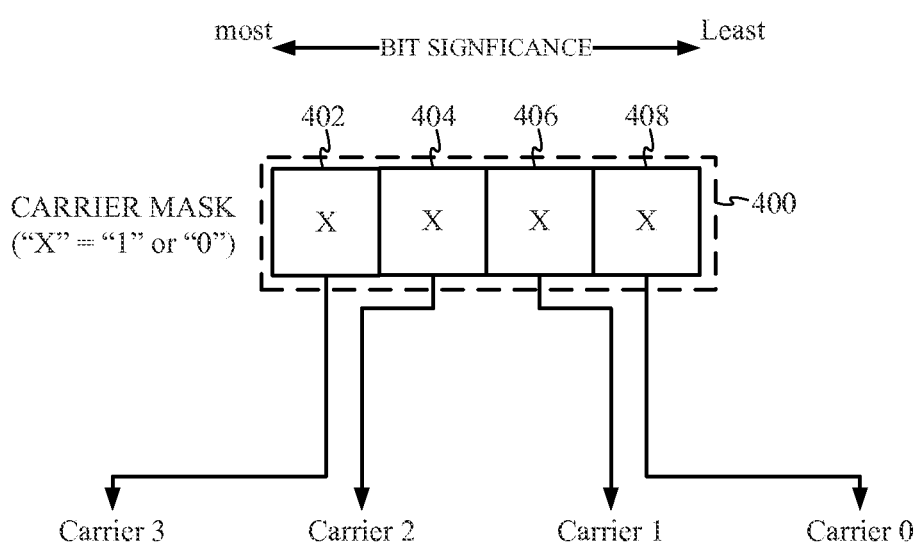
FIG. 4 is a diagram of a carrier mask-to-carrier mapping scheme for use in RUMs in a multi-carrier system, in accordance with one or more aspects.

Referring to FIG. 4, where the bandwidth is being divided into 4 carriers, a CM 400 contained in an RUM will have the form XXXX, where each X is a bitmap that may be a "1", indicating that the carrier to which it refers is to be blocked (i.e., is to reduce interference over), or a "0", indicating that the carrier to which it refers is not being blocked. Further, in the described exemplary implementation, where the carriers are numbered "0", "1", "2", "3", a left-most bit 402 in the CM 400 is the bitmask for carrier "3", a second bit 404 located to the right of the left-most bit 402 is the bitmask for carrier "2", a third bit 406 located to the right of the second bit 404 is the bitmask for carrier "1", and a fourth bit 408 located to the right of the third bit 406 is the bitmask for carrier "0". For the aspect in which the whole bandwidth may be blocked by an RUM, the RUM will contain a CM with all "1's" indicating that the access point wants to block every carrier in the bandwidth. Still other aspects provide for employing a CM to indicate a number of carriers allocated to the access point. For instance, a 6-bit mask may be utilized to indicate that RUMs may be sent for up to six carriers. The access point may additionally request that an interfering node refrain from transmitting over all or a subset of the allocated subcarriers.

At 306 and 308, during the creation of the CM to implement partial bandwidth interference management, two of the variables that need to be determined are the number of carriers that should be blocked by the access point as well as the specific identity of the carriers that should be blocked.

At 310, the weighted and masked RUM may be transmitted to one or more other nodes. As discussed herein, when a node hears the RUM, it needs to obey the RUM only with respect to the carriers specified in the carrier mask. For example, when an access terminal needs to obey multiple RUMs from different access points, it must perform an 'OR' operation on the carriers in all the RUM carrier masks—the complement of this mask indicating the carriers that the access terminal is able to request from an access point.

In an aspect of the system, nodes such as access points are organized in a way to use a first set of carriers to serve associated access terminals close to them with a first level of transmission power. The rest of the carriers are used with a second level of transmission power and can be used by both distant and close associated access terminals. The first level of transmission power is lower than the second level of transmission power. The carriers assigned to the first level of transmission power are referred as the low power carriers and the carriers assigned to the second level of transmission power are high power, respectively. To minimize interference of high power carriers for clients of neighboring access terminals, the cells are further organized in a way that two adjacent cells do not use the same high power carriers. Thus, both close and distant subscribers of an access point will not be affected by the high power carriers of a neighboring access point as interference.

Figure 5:
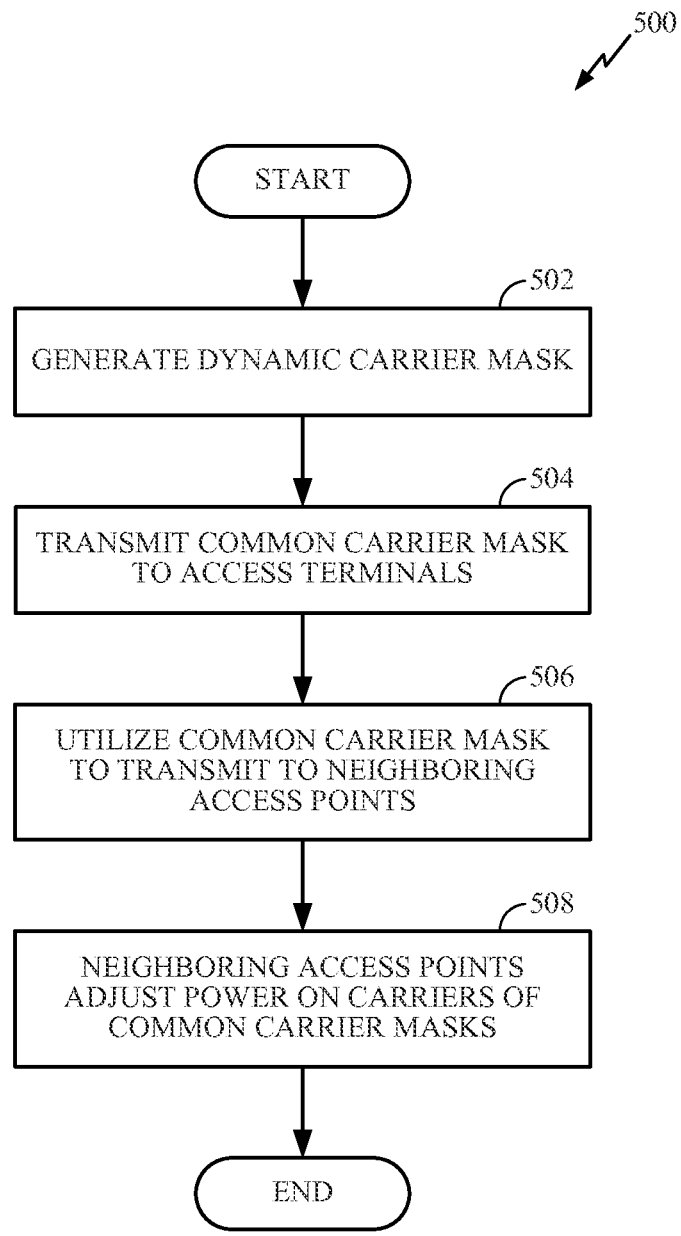
FIG. 5 is an illustration of a methodology for implementing a flexband system using pseudorandom carrier masks, in accordance with one or more aspects.

In one exemplary implementation, a dynamic bandwidth sharing, flexband, system is created in the forward link using multi-carrier RUMs following a process 500 illustrated in FIG. 5. In step 502, each base station generates a dynamic carrier mask. In an aspect, the dynamic carrier mask is generated based on a pseudorandom sequence, as further described herein. In each time slot, the node generates a new carrier mask, and uses this to select the carriers to block.

In step 504, each access terminal that is associated with the access point is provided with a common carrier mask. In an aspect, this may be ensured by providing the associated access terminals with the same key as the access point to generate the pseudo-random sequence.

In step 506, when one or more of the associated access terminals need to perform interference management, they send out RUMs such as in 222 of FIG. 2 following the common carrier mask. In effect, all access terminals associated with the access point will send out RUMs using the same carrier mask as generated by the access point. Different access terminals associated with the same access point may send out RUMs for different number of carriers, but will use the same carrier mask priority sequence.

In step 508, a neighboring access point may hear one or more of these RUMs sent from the access terminals, such as in 224 and 226 of FIG. 2. It will then obey these RUMs and reduce its power on these carriers. In one aspect, the associated access terminals may also be required to reduce power on these carriers, thereby ensuring all related nodes have the same transmission profile.

In an aspect, pre-planning can be used to ensure that neighboring base stations have complementary carrier masks. Thus, in a slot when a particular carrier (e.g., carrier 1) appears at the front of the carrier mask in a first access point, its neighboring access points will have that same carrier (e.g., carrier 1) appear towards the end of their carrier masks.

Figure 6:
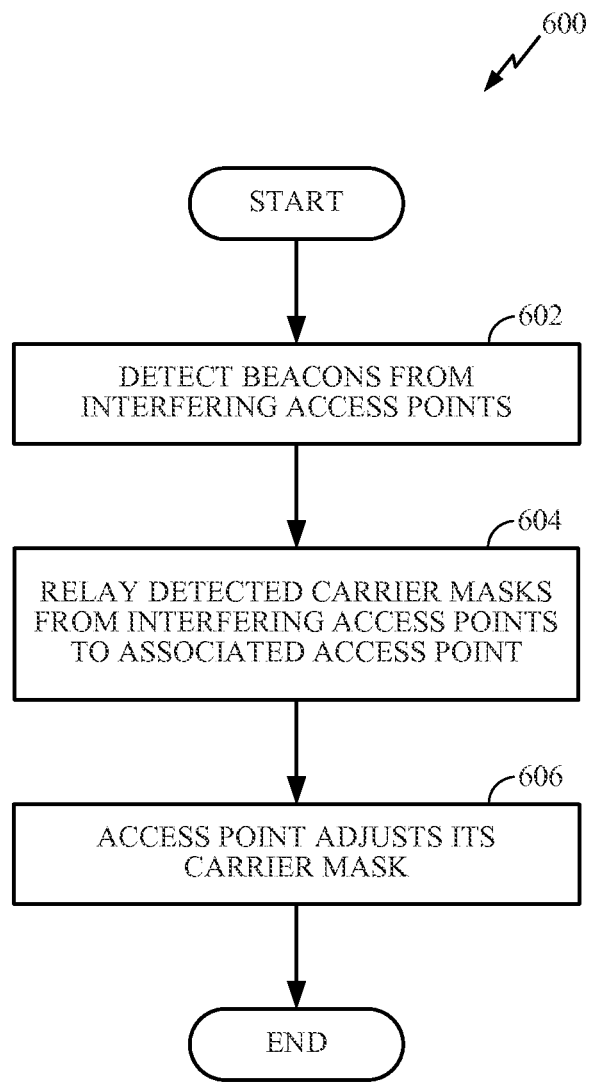
FIG. 6 is an illustration of a methodology for creating dynamic learning/adjustment of neighboring base-station carrier masks in accordance with one or more aspects.

In another aspect, dynamic learning/adjustment of neighboring base-station carrier masks can also be used. An exemplary process 600 of the operation of this approach on the forward link is illustrated in FIG. 6, where, in 602, the access terminals that are associated with a particular access point listen to the super-frame preambles or beacons from interfering access points. These beacons (or super-frame preambles) carry information about the carrier mask used by the interfering access points. In 604, this information is relayed to the access point associated with the access terminal, which could adjust its mask accordingly in 606.

Consider an example. Access point A's carrier mask priority sequence is "4231" while neighboring access point B's sequence is "1324". When access terminals belonging to both neighboring access points send out RUMs, they will do so on different carriers. Suppose access point A's access terminals send out RUMs with carrier mask "1010" (2 blocked carriers) while access point B's access terminals send out RUMs with carrier mask "0001" (1 blocked carrier). Access point B will then obey access point A's RUM and reduce its power on carriers 4 and 2, while access point A will reduce its power on carrier 1. This achieves a flexband behavior in a dynamic fashion.

In one aspect, different from a static flexband system, the multicarrier RUM system imposes restrictions as needed. For example, only when some nodes do not meet their QoS requirements, power restrictions on specific carriers will apply.

Figure 7:
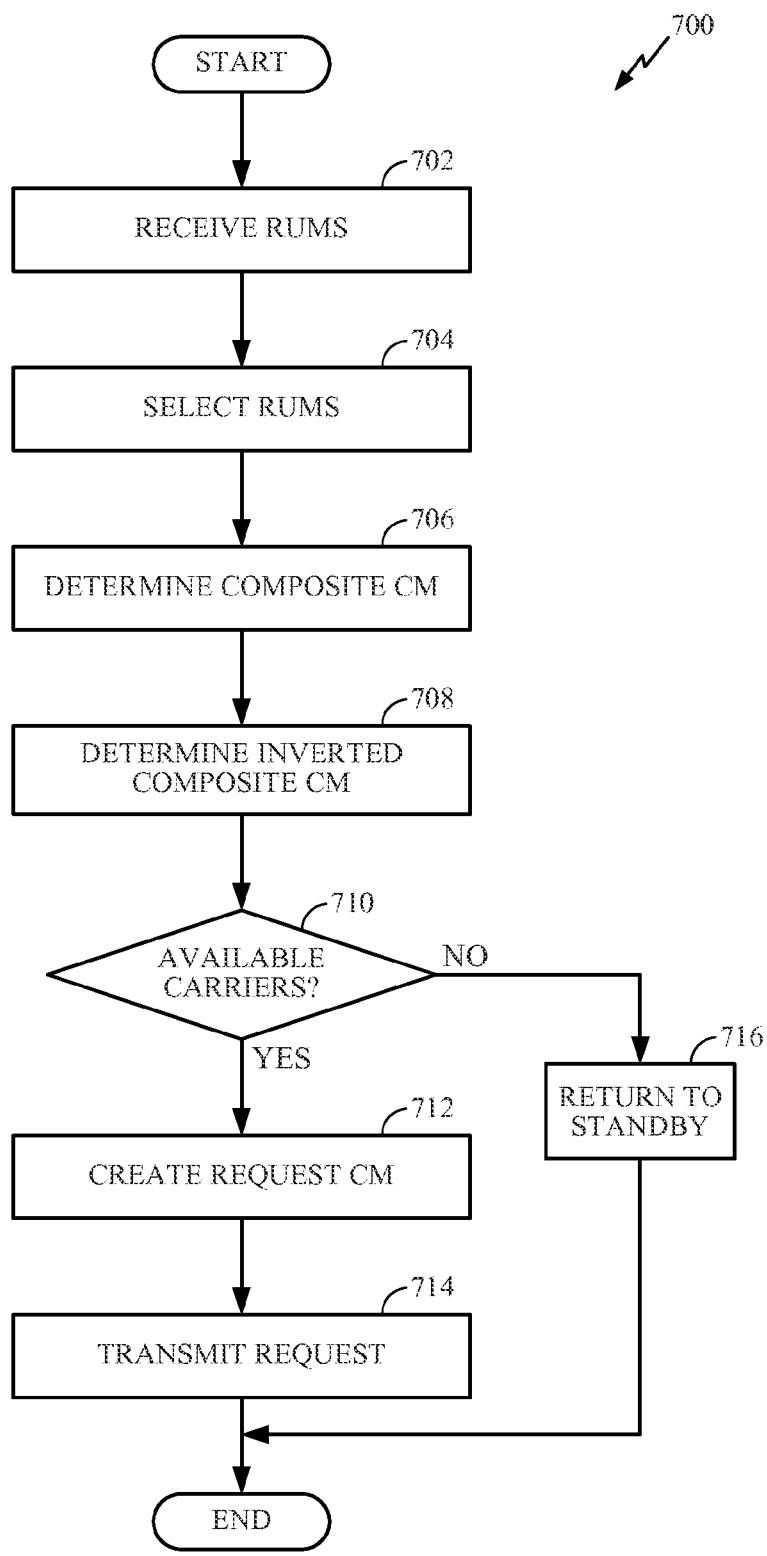
FIG. 7 is an illustration of a methodology for an access terminal in requesting bandwidth from an access point based on received RUMs, in accordance with one or more aspects.
Figure 8:
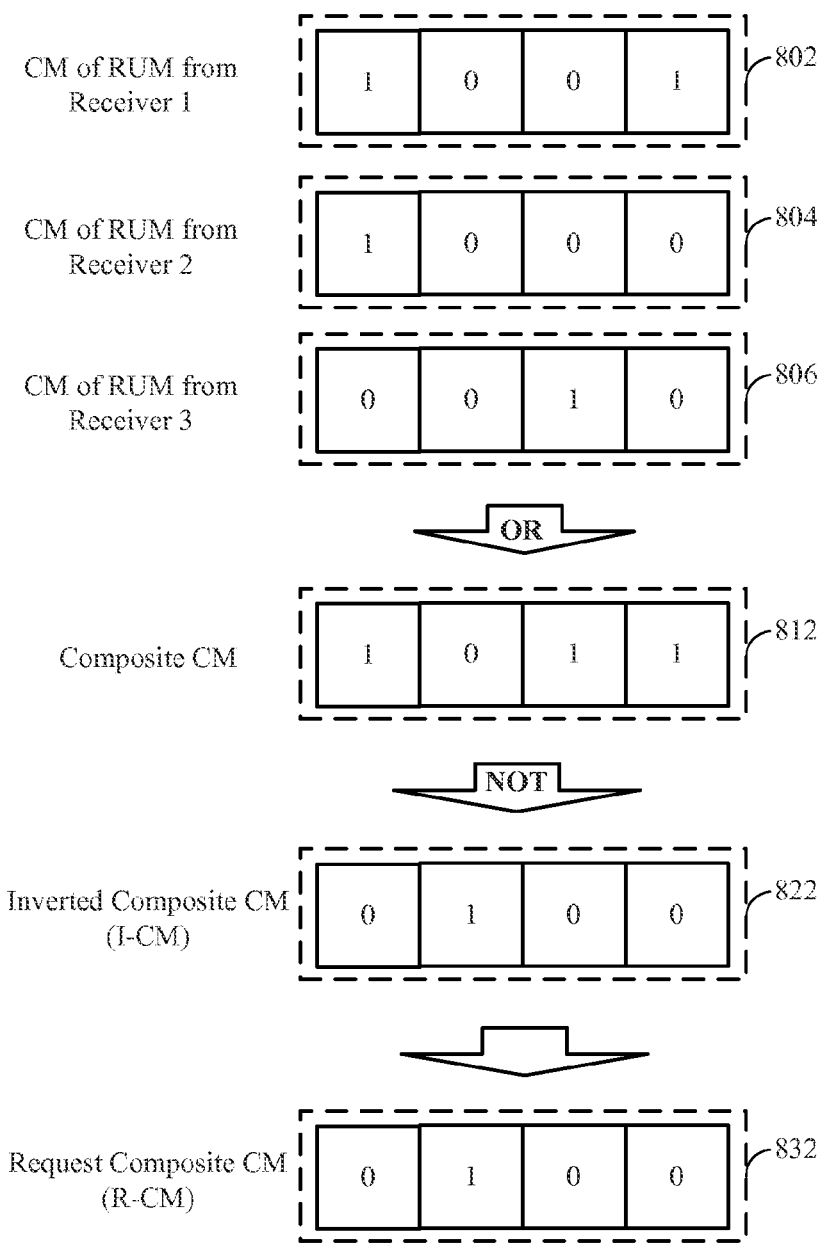
FIG. 8 is an illustration of a sequence of carrier masks created based on one or more received RUMs, in accordance with one or more aspects.

Referring again to FIG. 2, the operation of an access terminal such as access terminal 292 in requesting bandwidth in 222, 232 and 242 is now described with reference to FIG. 7, with reference also being made to FIG. 8. In 702, the access terminal 292 receives and collects the RUMs sent by any access point, including its associated access point 1 294.

In 704, in an aspect of the operation of the access terminal 292, the access terminal 292 considers only those RUMs that have a weight higher than the weight of the access point associated with the access terminal 292 (i.e., access point 1 294) from the received RUMs. Consider the example where the access terminal 292 has received RUMs from three access points in addition to one from access point 1 294, its associated access point—each of these three other RUMs having a weight higher than the weight of the RUM from the access point 1 294. These three RUMs have CMs of CM 802 ("1001"), CM 804 ("1000"), and CM 806 ("0010"), following the exemplary CM form as described in FIG. 4. Further, assume that, based on the weights of the three RUMs, the access terminal 292 must take these RUMs into account. Thus, the access terminal 292 must process the CMs contained in the three RUMs.

In 706, assuming that the access terminal 292 must consider and process the three received RUMs, the access terminal 292 will performs an "OR" operation across the CMs of these RUMs to create a composite CM 812 (i.e., a composite carrier mask). Continuing the above example, the composite CM 812 is "1011". In one aspect, the CM from the associated access point of the access terminal 292 is not utilized.

In 708, to determine if there are any carriers on which the access terminal 292 can request bandwidth, the access terminal 292 performs a "NOT" operation on the composite CM 812 to create an inverted composite CM (I-CM) 822 that will indicate which carriers are available. The I-CM 822 may be used by the access terminal 292 in its request for bandwidth from access point 1 294.

In 710, it is determined if there are carriers over which the access terminal 292 can request bandwidth. In one aspect of the exemplary operation of the access terminal 292, the access terminal 292 will determine if there are any carriers that are not blocked through the use of the I-CM 822. For example, if there is at least a single "1" value in the I-CM 822, then there is at least one carrier available.

In 712, if there are available carriers, the access terminal 292 will create a request CM (R-CM) 832. In one aspect, the R-CM 832 is set to be the I-CM 822 created in 710. Continuing the example above where the bandwidth is divided among four (4) carriers, the R-CM 832 will also have the same form as the CM 400, which is the form "XXXX", where each "X" may be a "1", indicating that the access terminal 292 is requesting to transmit on that carrier, or a "0", indicating that the access terminal 292 is not requesting to transmit on that carrier. Thus, a CM having the value "0100" may be sent in the request to the access point 1 294. In other words, the access terminal 292 will consider carriers "3", "1", and "0" as blocked, with carrier "2" being open. Should the access terminal 292 decide to request bandwidth; the R-CM 832 would be "0100".

Figure 9:
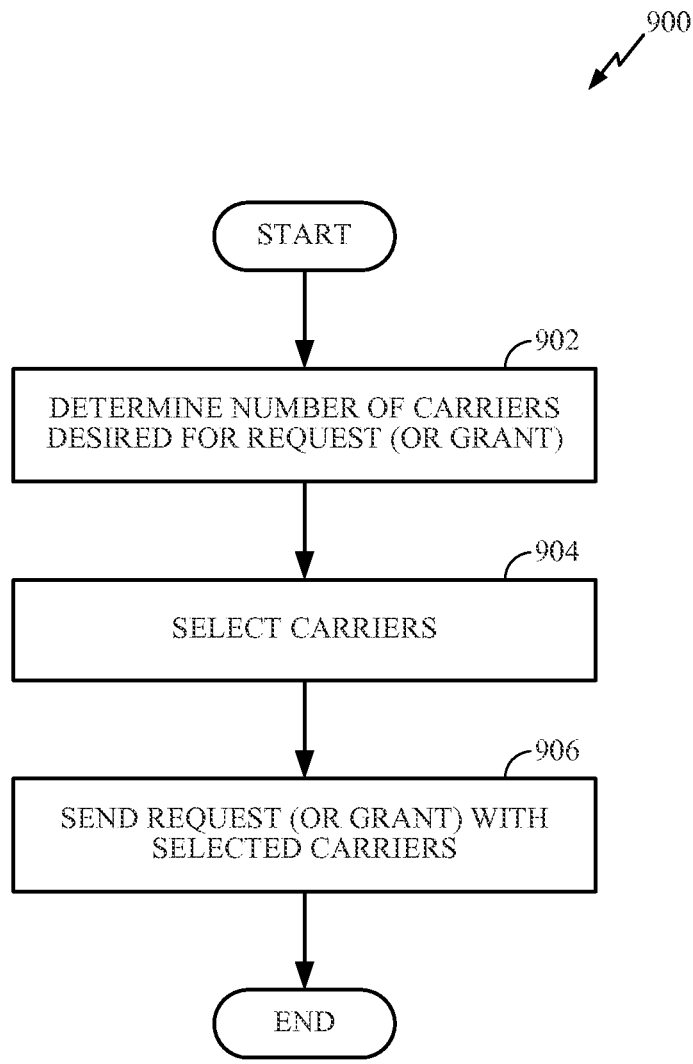
FIG. 9 is an illustration of a methodology for determining the number and selection of carriers to be requested as part of a request to transmit by an access terminal to an access point as well as determining the number and selection of carriers to be granted as part of a grant of the request by the access point to the access terminal.

In another aspect, the R-CM 832 is based on, but not identical to the I-CM 822, as illustrated by FIG. 9, where a process 900 to determine how many carriers to be placed in a request to transmit by the access terminal 292 to the access point 1 294 is illustrated. The figure may also be used to describe the number of carriers that the access point 1 294 will grant the access terminal 292, as further explained herein.

In 902, the access terminal 292 will determine a number of carriers that it will request. This determination may be based on the amount of traffic that the access terminal 292 wishes to transmit. Such determination may also be based on, for instance, need associated with interference experienced at the access terminal, or any other suitable parameter (e.g., latency, data rate, spectral efficiency, etc.)

According to other aspects, if a weight is associated with each node, the determination of the number of carriers desired for a given transmission may be a function of the weight associated with the node, a function of weights associated with other nodes requesting carriers, a function of a number of carriers available for transmission, or any combination of the preceding factors. For example, a weight may be a function of a number of flows through the node, a level of interference experienced at the node, etc. According to other aspects, carrier selection may comprise partitioning carriers into one or more sets, and may be based in part on a received RUM that indicates that one or more carriers in a set of carriers is unavailable. The RUM may be evaluated to determine whether a given carrier is available (e.g., is not identified by the RUM). For example, a determination may be made that a given carrier is available if it is not listed in the RUM. Another example is that a carrier is deemed available even if an RUM was received for that carrier, but the advertised weight for that carrier was lower than the weight advertised in the RUM sent by the node's receiver.

In 904, the access terminal 292 will determine the specific carriers it will request in the R-CM, which may depend on specific carriers designated for particular traffic types or predetermined selection criteria. In one aspect, the carriers that are selected are a function (e.g., a subset) of the available carriers determined in step 710. Carrier selection may also be performed with a preference for available carriers. For instance, carriers that are known to have been available in a preceding transmission period may be selected before carriers that were occupied in the preceding transmission period. It should be noted that the sequence of operations illustrated by 902 and 904 may be reversed or combined in that the total number of carriers that may be requested may be dictated by the carriers available. For example, if there is only one carrier available for selection, then the sequence of operations illustrated by 902 and 904 may be merged.

In 906, the request will be sent after the R-CM has been constructed. In the above example, the only configuration possible of the R-CM is "0100" as there is only one carrier available. In another example, if all four carriers are available, and the access terminal 292 wishes to transmit over carriers 0, 1 and 3, then a R-CM of "1101" would be created.

In addition to determining the quantity of carriers that needs to be listed in a CM, another consideration is the specific identity of the carriers that ought to be blocked by a node sending out an RUM. In one aspect, each node selects the specific carriers they wish to block using a pseudorandom carrier selection approach, where a mask will be created based on a CM priority list. Specifically, the carriers that are selected for inclusion in the CM are chosen in the order specified in the CM priority list. The CM priority list is pseudo-randomly created for each slot, or communication period.

Figure 10:
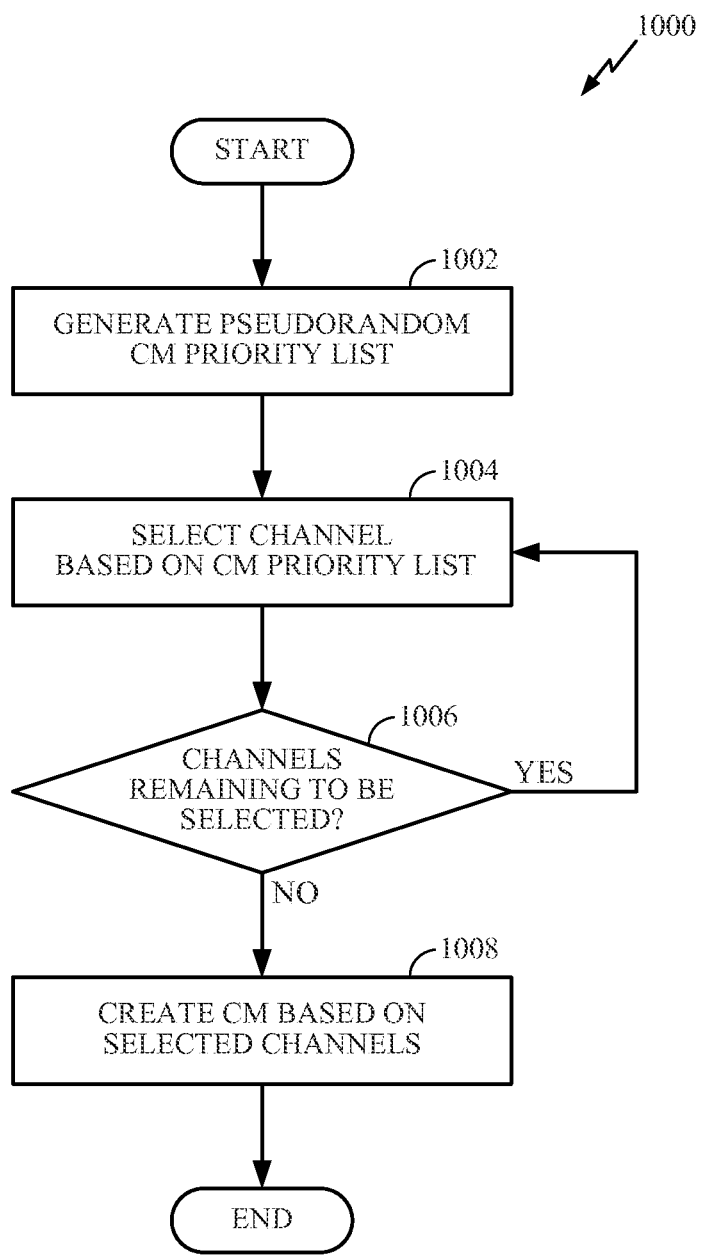
FIG. 10 is a flow diagram illustrating a carrier mask creation process that is based on a pseudorandom carrier mask priority list.

FIG. 10 illustrates the operation of an exemplary pseudorandom carrier selection process 1000, where in 1002, a CM priority list is randomly created. In 1004, a carrier is selected from the CM priority list. Then, it is determined if there are any carriers remaining to be selected in 1006. For example, if more than one carrier needs to be selected, and only one carrier has been selected, then the process returns to 1004, where another carrier is selected from the CM priority list. If all the carriers that need to be selected have been identified, then operation continues with 1008, where a CM is created based on the carriers selected from the CM priority list. Regarding 1002, in another aspect of the pseudorandom carrier selection process 1000, the CM priority list is generated only if it is determined that at least one carrier is going to be blocked.

FIG. 11 illustrates a table 1100 illustrating the masks created with the pseudorandom carrier selection process 1000, where a plurality of slots 1110 is shown with a plurality of CM priority lists 1120, which lists the carriers to be masked with an order of priority; a list of the number of carriers to be blocked 1130; and a list of the resulting CMs 1 140. Four carriers are assumed to be available in the exemplary system, with the listing of the carriers in each CM having a most-significant bit that is the left-most bit, thus, carrier "3" is indicated by the left-most bit in the CM, carrier "2" is the second left-most bit, carrier "1" is the third left-most bit, and carrier "0" is the fourth left-most bit (or right-most bit).

For example, during a slot 1 1112, a CM priority list 1122 of "3, 2, 1, 0" is listed, which indicates that if only one carrier is to be blocked, then only the first carrier in the list—i.e., carrier "3", will be included in the resultant CM. If two carriers are to be blocked, then the first and second carriers in the list—i.e., carriers "3" and "2", will be included in the resultant CM. If three carriers are to be blocked, then the first, second, and third carriers—i.e., carriers "3", "2" and "1", will be included in the resultant CM. If all four carriers are to be blocked, then carriers "3", "2", "1" and "0" will be included in the resultant CM. As illustrated in FIG. 11, as two carriers are to be blocked (as indicated by a number of carriers to be blocked indicator 1132), a resultant CM 1142 of "1100" is created.

In a slot 2 1114, three carriers are to be blocked, as indicated by a number of carriers to be blocked indicator 1134. Given a CM priority list 1124 of "0, 2, 3, 1", a resultant CM 1144 of "1101" is created because carriers "0", "2", and "3" are selected for the CM. If only two carriers needed to be selected, a resultant CM of "0101" would be created as carriers "0" and "2" would be selected. If only one carrier needed to be selected, a resultant CM of "0001" would be created because carrier "0" would be selected.

In a slot 3 1116, one carrier is to be blocked, as indicated by a number of carriers to be blocked indicator 1136, and given a CM priority list 1126 of "2, 1, 0, 3", a resultant CM 1146 of "0100" is created because carrier "2" is selected for the CM.

In a slot 4 1118, no carriers are to be blocked, as indicated by a number of carriers to be blocked indicator 1138, and a resultant CM 1148 of "0000" is created because carrier "2" is selected for the CM.

In another aspect, instead of each node generating a pseudorandom CM priority list for each slot, each node is configured with a fixed, static CM priority list. Using the fixed, static CM priority list, the number of carriers to be blocked is to be selected in the order as specified in the CM priority list. Thus, in order to block one carrier, the first carrier from the fixed CM priority list will be chosen. In order to block two carriers, the first two carriers in this fixed CM priority list will be chosen, and so on. In this scheme, by choosing the carriers to be listed in the resultant CM (i.e., the carriers to be blocked) in a predetermined fashion, frequency reuse may be incorporated. In a first instance, a node would normally be able to use all the frequencies. However, during times of congestion, a node will switch to selecting the number of carriers to be blocked in the order as specified by the node's fixed CM priority list. In one approach, the fixed CM priority list can be transmitted to each node using a wireline connection where the node is wired. For example, where the node is an AP that is wired to the network, the AP can be sent the static CM priority list from a controller.

In another aspect of a dynamic flexband system, a resultant carrier mask is created using a CM priority list that is based on measurements of the interference over thermal (IOT) detected for each carrier, where a CM priority list is generated that includes each carriers along with the IOT measured for that carrier. Then, the carriers listed in the CM priority list are sorted in order of the measured IOT from the highest IOT to the lowest. In an approach, the carriers over which power is to be reduced are chosen from the CM priority list in the sorted order, which are the carriers over which the node has been seeing the most interference. In this approach, reducing power over these carriers will be of most benefit to other nodes. However, these are also the carriers where the node is likely to affect the largest number of neighboring nodes. In another approach, the carriers are sorted from the smallest IOT to the largest, in that order. Thus, in this other approach, the node will leave aside those carriers where it is facing a lot of contention and, instead, focus on those carriers where it will likely affect the least number of competitors.

Figure 12:
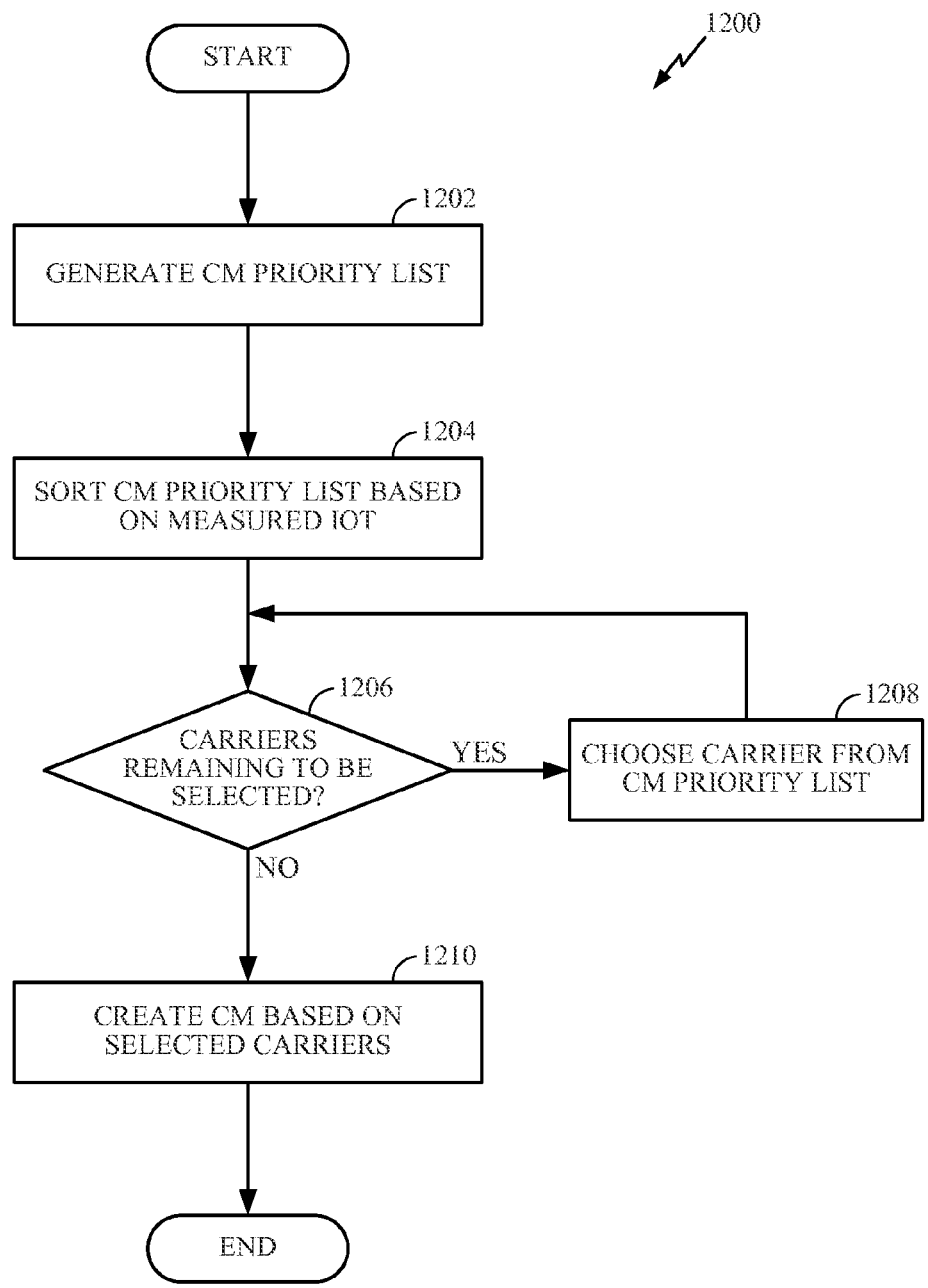
FIG. 12 is a flow diagram illustrating a carrier mask creation process that is based on a carrier mask priority list prioritized using interference over thermal measurements.

FIG. 12 illustrates a CM creation process 1200 where, in 1202, a CM priority list is generated that includes each carrier along with the IOT measured for that carrier. Then, in 1204, the carriers listed in the CM priority list are sorted in order of the measured IOT. In one approach, as discussed above, the carriers that are listed higher in the list are the carriers on which the node estimates that the interfering nodes will cause the most interference. In another approach, the carriers that are listed higher in the list are the carriers on which the node estimates that the interfering nodes will cause the least interference. The carrier(s) to be identified to be included in the CM will be selected from the sorted CM priority list in a predetermined fashion (e.g., top to bottom). For example, consider an exemplary CM priority list of "3", "2", "0" and "1" that is a highest IOT to lowest IOT sorted CM priority list, which means that the node has identified that carrier "3" has the highest IOT and carrier "1" has the lowest IOT, with carriers "2" and "0" being the carriers with the second and third highest IOTs, respectively. If interference is being caused on only two of the four carriers, then carriers "3" and "2" will be selected, in that order, based on the example of the node being configured to limit the interference on the carriers where it detects the highest IOT.

In 1206, it is determined if there are any carriers that need to be identified for inclusion in the CM. In one aspect, this is determined by determining if there has been a sufficient number of carriers identified to equal the number of carriers over which power is to be reduced. Continuing with the previous example, if power needs to be reduced over two carriers, but only one of those carriers (e.g., carrier "3") has been identified, then a sufficient number of carriers over which power is to be reduced has not been identified.

To continue to identify carriers over which power is to be reduced, operation continues with 1208, where a carrier is chosen from the CM priority list. Continuing with the example, where a carrier (i.e., carrier "3") has been identified, carrier "2", which is next in the list below carrier "3", is identified for inclusion in the CM.

If all the carriers that need to be identified by the CM over which power is to be reduced has been identified, then the CM is created in 1210. Again, continuing with the example given, if the two carriers ("3" and "2") have been identified for inclusion in the CM based on their position in the CM priority list, then no additional carriers need to be identified and a CM of "1100" (e.g., the CM with carriers "3" and "2" being indicated) is created.

In another aspect, the carriers over which power is to be reduced are chosen based on the amount of interference the node estimates will be encountered on the carriers. In an approach, the node will note carriers that it estimates will encounter the most interference. The consideration for this approach is that the node wishes to reduce as much interference on possible on the carriers on which it is experiencing the most interference. In another approach, the node will increase power over the carriers that it estimates will encounter the least interference. The consideration for this approach is that the node will be using the carriers that the fewest other nodes are transmitting on, thereby causing the least amount of disruption for the other nodes using this carrier.

Figure 13:
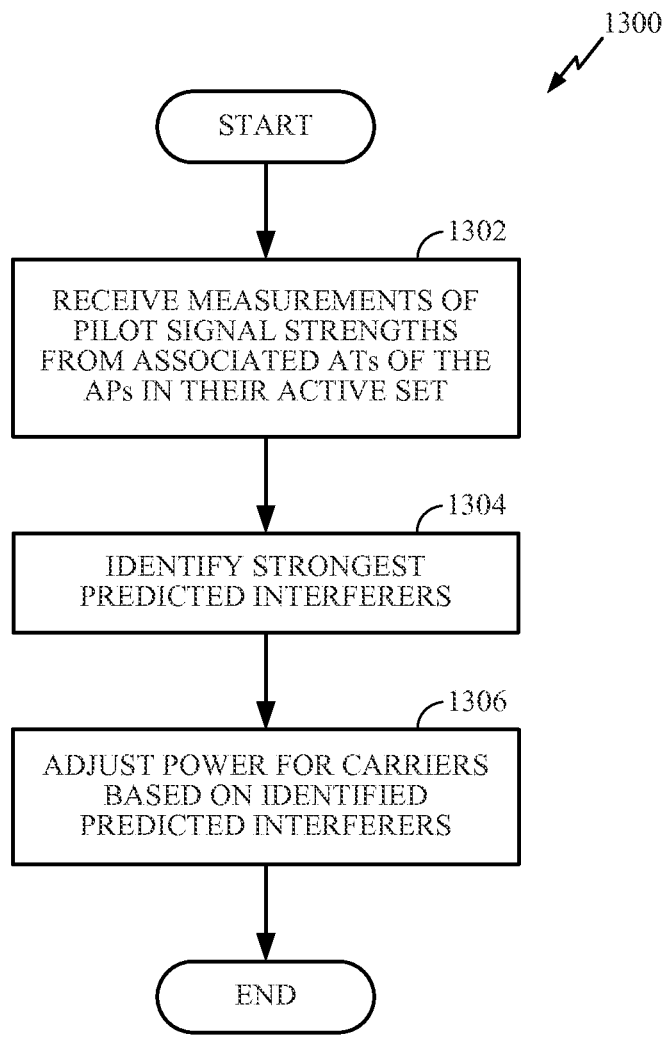
FIG. 13 is a flow diagram illustrating a power adjustment process that is based on an estimate by a node of the carriers on which interfering nodes will cause the least/most interference.

FIG. 13 illustrates a carrier selection process 1300 performed on an AP where, in 1302, the AP receives from each AT associated with the AP measurements by the particular AT of the pilot signal strengths from each of the APs in the active set of the particular AT. For example, where a network includes an AP_0 associated with an AT, the AT will measure the strengths of the pilot signals it receives from all the APs in its active set and report those measurements to AP_0. In an approach, each AT predicts its primary interferer based on a sequence of interference measurements received over many previous slots. Further, each AT can identify its primary interferers because each AP sends its identification information in its RUM message.

In 1304, the strongest predicted interferers are identified by the AP based on the measurements received from its associated ATs. For example, consider the situation where AP_0 is associated with a group of ATs, and certain ATs in this group of ATs experiences interference from an AP_1 and an AP_3. In this case, AP_0 will receive reports from its associated ATs that the APs causing them the most interference are AP_1 and AP_3, and AP_0 will determine if these are the strongest predicted interferers.

In 1306, the AP will create the CM used to manage interference from those identified APs from which interference has been detected and is predicted to continue (i.e., the predicted primary interferers). In an aspect, the AP will maintain the power of transmission of the AP on the carriers not listed in the carrier masks transmitted by the identified APs while reducing the power of transmission over the carriers listed in the carrier masks of those interfering APs. In other words, the AP will utilize the measurements by the ATs to create a transmission profile for a set of carriers complementary to the set of carriers used by predicted primary interferers. In an aspect, a union carrier mask (U-CM) may be created to list the carriers contained in the union of the carrier masks transmitted by the predicted primary interferers for each group. Further, a complementary carrier mask (C-CM) may be created for the purpose of listing the carriers that are in the set of carriers complementary to the carriers in the U-CM, and this is the CM that is used as the resultant carrier mask (R-CM) used to determine which carriers to reduce interference. In the example, although multiple levels of power transmission may be supported, the R-CM only indicates the carriers over which power will be reduced. These are the carriers with a "1" in the carrier position. Continuing with the current example, AP_0 will reduce power on the carriers that in the R-CM, which the carriers that are strongly interfered with by {AP_1, AP_3} that are contained in a complement of the U-CM of the carrier masks transmitted by AP_1 and AP_3.

It should be noted that not all carriers in the C-CM need to be listed in the R-CM. Instead, in another aspect, if the number of carriers of the AP (e.g., AP_0) over which the power needs to be adjusted is less than the number of carriers listed in the C-CM, then the R-CM will only list the carriers that the AP desires to adjust. In this later aspect, the C-CM may be used as a CM priority list from which the AP will first chose carriers to reduce power over.

Figure 14:
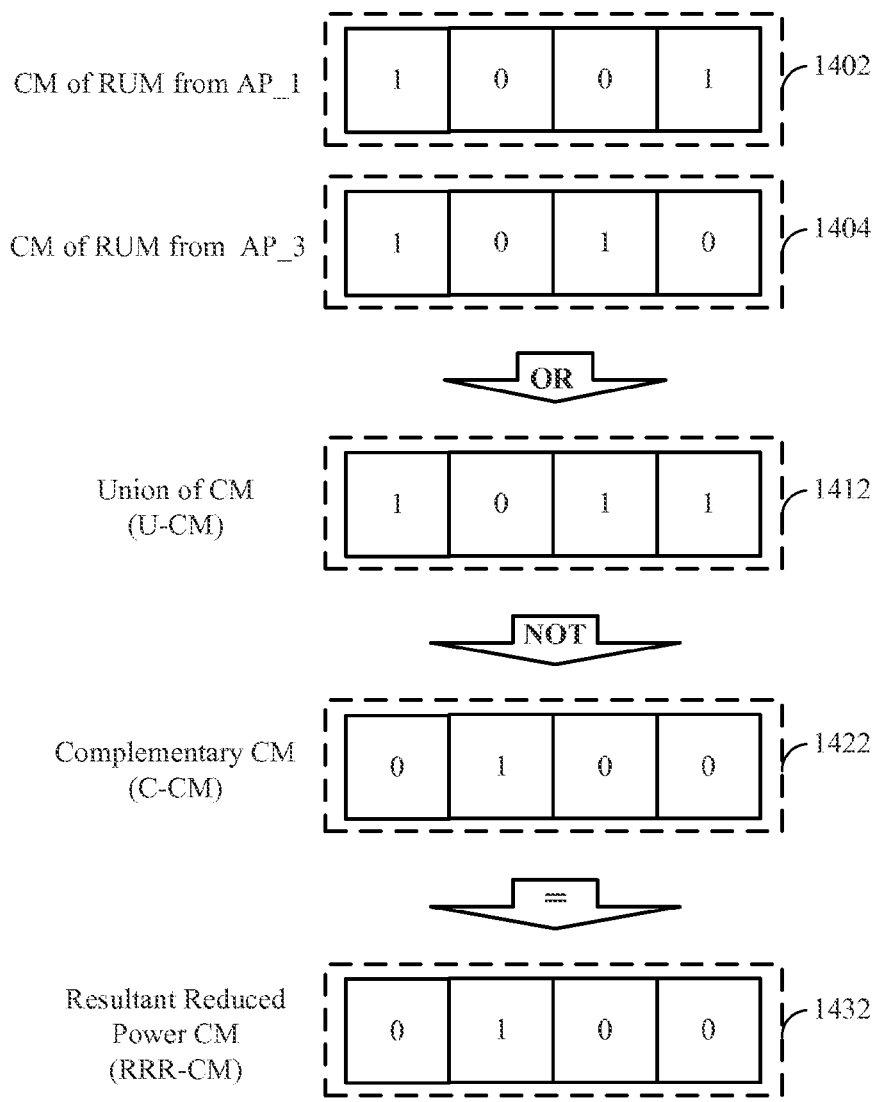
FIG. 14 is a block diagram illustrating the creation of a carrier mask based on the carrier selection process of FIG. 13.

FIG. 14 illustrates a CM created based on the carrier selection process 1300 of FIG. 13, where an AP_1 CM 1402 from an RUM received from AP_1 of "1001" is shown, indicating that AP_1 wishes to minimize interference over carriers "3" and "0". An AP_3 CM 1404 of an RUM received from AP_3 "1010", indicating that AP_3 is receiving interference on carriers "3" and "1", is also shown. A union of the AP_1 CM 1402 and the AP_3 CM 1404 produces a U-CM 1412 of "1011", where carriers "3", "1" and "0" are identified as requested to reduce interference in the CM by the combination of AP_1 and AP_3, while a C-CM 1422 created by a complement of U-CM results in a listing of carrier "2" as being the only carrier not requested for others to reduce interference by AP_1 and AP_3. A resulting RRR-CM 1432 is constructed from C-CM 1422, which in the aspect disclosed herein, RRR-CM 1432 is set to be equal to C-CM 1422.

Referring back to FIG. 7, in 714, the access terminal 292 will send a request to the access point 1 294 that will carry the R-CM that lists the carriers over which the access terminal 292 intends to transmit data. The request may be a request for a first plurality of carriers with power that were not reduced in a most recent time slot that affects the access terminal 292. The request message sent at 714 may additionally be power-controlled to ensure a desired level of reliability at the access point 1 294.

In 716, if there are no available carriers, then the access terminal 292 will return to a "standby" mode to await the next RUM message broadcast or any message from the access point 1 294.

Figure 15:
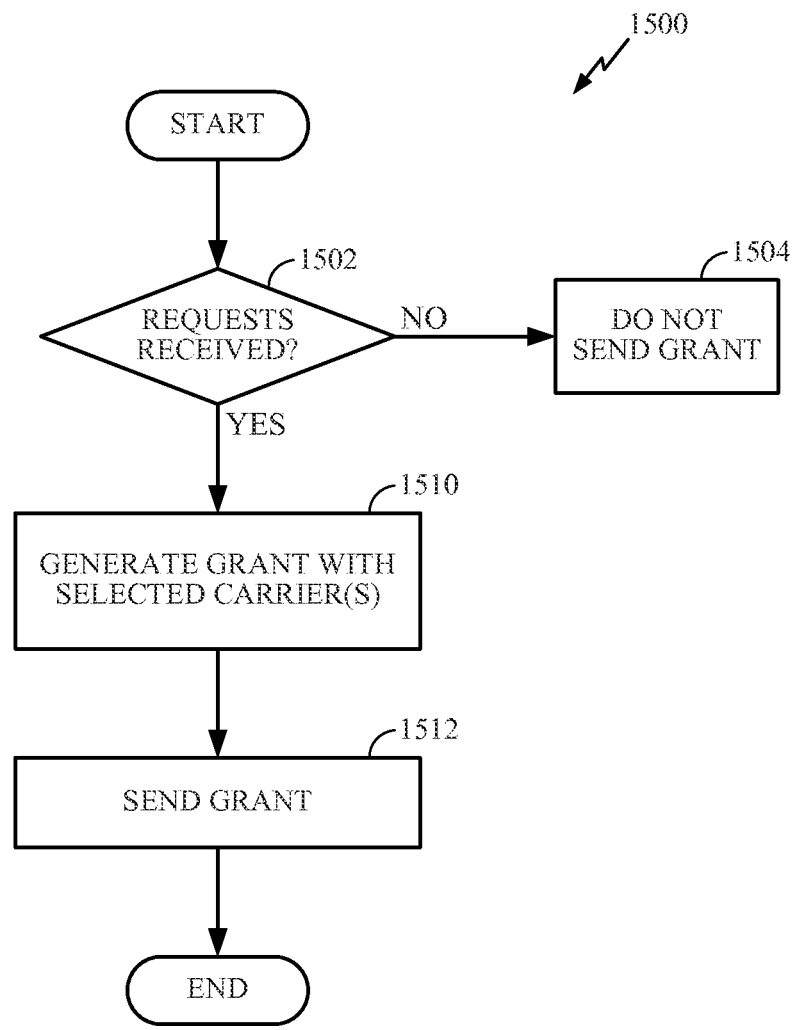
FIG. 15 is an illustration of a methodology for generating a grant for a request to transmit, in accordance with one or more aspects.

FIG. 15 illustrates a methodology 1500 for processing requests, and generating a grant for a request to transmit, such as the access point 1 294 in 264, in accordance with one or more aspects. As discussed, each access terminal (e.g., access terminal 292) that has traffic to send may send a request to their respective access point (e.g., access point 1 294) unless it is blocked by an RUM from another access point. Based on the requests received by the access point 1 294, the access point 1 294 may decide to grant a given request on one or more requested carriers.

In 1502, the access point 1 294 assesses requests. If no requests have been received, then in 1504 the access point 1 294 will refrain from sending a grant message.

If at least one request has been received from an access terminal, then in 1510, the access point 1 294 will determine the number and selection of the carriers it will grant in response to the request. The process illustrated in FIG. 9 as described above with reference to the generation of a request to transmit by an access terminal (e.g., access terminal 292) may also be used to describe the selection of the carriers to be granted in response to the request. In 902, the access point 1 294 will determine the number of carriers it will assign to each access terminal (e.g., access terminal 292) as a part of its process of assigning bandwidth to all the access terminals that it serves from which it has received a request. Then, in 904, the access point access point 1 294 will determine the specific carrier(s), if any, over which it will grant each access terminal (e.g., access terminal 292) permission to transmit.

In an aspect, an access point is limited in its ability to assign carriers in the grant in response to each request from an access terminal. For example, the access point 1 294 may be limited to assigning only the carriers that correspond to the carriers found in the R-CM contained in the previously received request from the access terminal 292. In other words, the access point may assign to a particular access terminal only the carriers found in the group of carriers listed by the CM contained in the previous request (i.e., R-CM) from a particular access terminal.

In 1512, once all possible grants are generated in 1510, then they are sent to their respective requesting access terminals (e.g., the access terminal 292).

According to related aspects, an access point may periodically and/or continuously assess whether it has data outstanding from one or more of the access terminals that it serves. This is true if the access point has received a current request or if it has received a prior request that it has not granted. In either case, the access point may send out a grant when the access point determines that such a grant is warranted. Further, based on a determined grant rate (e.g., whenever the average transmission rate is below a target rate), the access point may send an RUM to reserve more bandwidth for its associated access terminals. Additionally, upon the receipt of the grant, the access terminal may transmit a data frame, which may be received by the access point.

Figure 16:
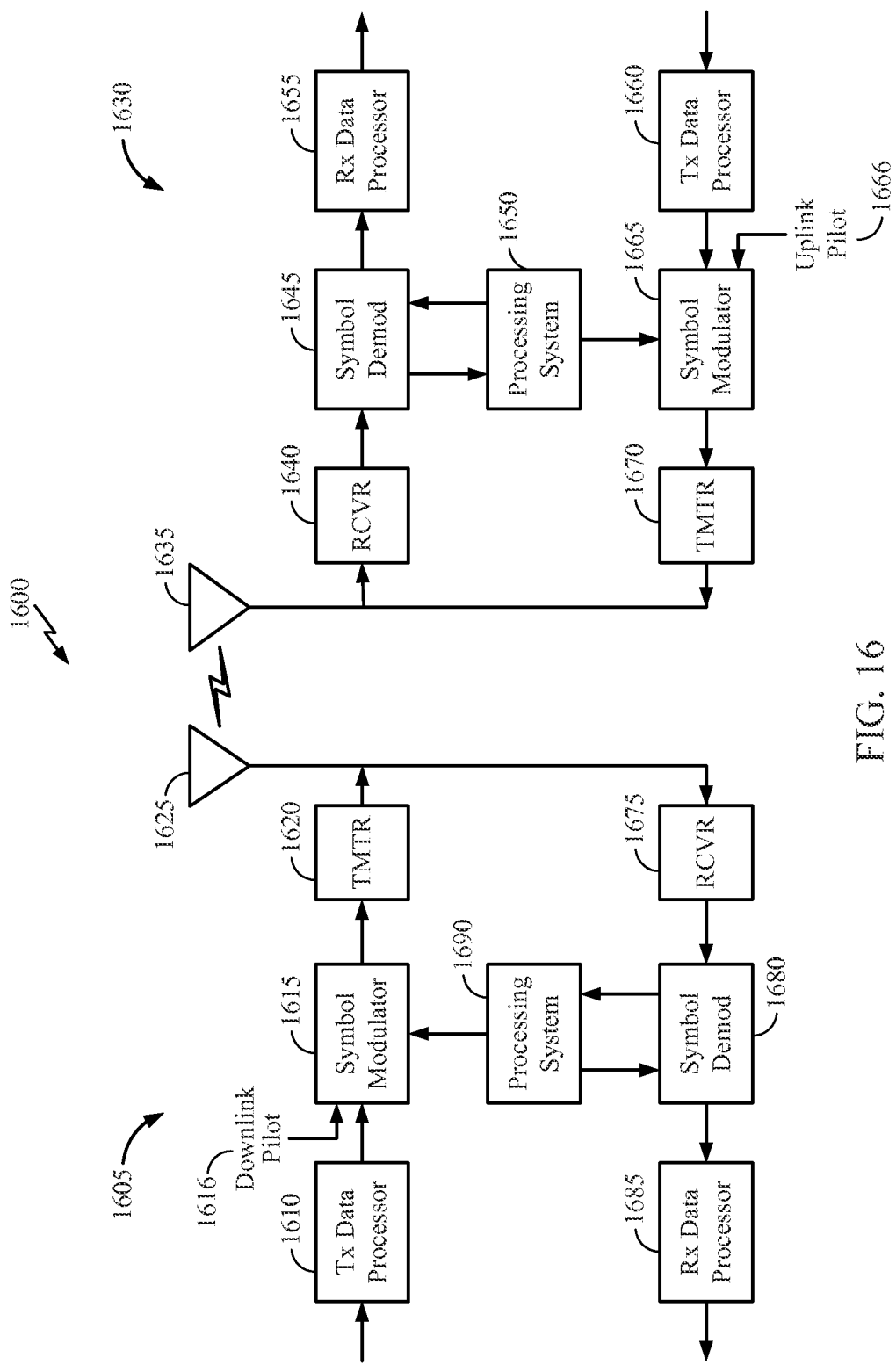
FIG. 16 is an illustration of a wireless network environment that can be employed in conjunction with the various systems and methods described herein.

FIG. 16 shows an exemplary wireless communication system 1600. The wireless communication system 1600 depicts one access point and one terminal for sake of brevity. However, it is to be appreciated that the system can include more than one access point and/or more than one terminal, wherein additional access points and/or terminals can be substantially similar or different for the exemplary access point and terminal described below. In addition, it is to be appreciated that the access point and/or the terminal can employ the methods and/or systems described herein to facilitate wireless communication there between. For example, nodes in the system 1600 (e.g., access point and/or terminal) may store and execute instructions for performing any of the above-described methods (e.g., generating RUMS, responding to RUMs, determining node disadvantage, selecting a number of carriers for RUM transmission, etc.) as well as data associated with performing such actions and any other suitable actions for performing the various protocols described herein.

Referring now to FIG. 16, on a downlink, at access point 1605, a transmit (TX) data processor 1610 receives, formats, codes, interleaves, and modulates (or symbol maps) traffic data and provides modulation symbols ("data symbols"). A symbol modulator 1615 receives and processes the data symbols and pilot symbols 1616 and provides a stream of symbols. Specifically, the symbol modulator 1615 multiplexes data and pilot symbols and provides them to a transmitter unit (TMTR) 1620. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), or code division multiplexed (CDM).

TMTR 1620 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1625 to the terminals. At terminal 1630, an antenna 1635 receives the downlink signal and provides a received signal to a receiver unit (RCVR) 1640. Receiver unit 1640 conditions (e.g., filters, amplifies, and frequency downconverts) the received signal and digitizes the conditioned signal to obtain samples. A symbol demodulator 1645 demodulates and provides received pilot symbols to a processing system 1650 for channel estimation. Symbol demodulator 1645 further receives a frequency response estimate for the downlink from processing system 1650, performs data demodulation on the received data symbols to obtain data symbol estimates (which are estimates of the transmitted data symbols), and provides the data symbol estimates to an RX data processor 1655, which demodulates (i.e., symbol demaps), deinterleaves, and decodes the data symbol estimates to recover the transmitted traffic data. The processing by symbol demodulator 1645 and RX data processor 1655 is complementary to the processing by symbol modulator 1615 and TX data processor 1610, respectively, at access point 1605.

On the uplink, a TX data processor 1660 processes traffic data and provides data symbols to a symbol modulator 1665 that receives and multiplexes the data symbols with pilot symbols 1666, performs modulation, and to create a stream of symbols. A transmitter unit 1670 then receives and processes the stream of symbols to generate an uplink signal, which is transmitted by the antenna 1635 to the access point 1605.

At access point 1605, the uplink signal from terminal 1630 is received by the antenna 1625 and processed by a receiver unit 1675 to obtain samples. A symbol demodulator 1680 then processes the samples and provides received pilot symbols and data symbol estimates for the uplink. An RX data processor 1685 processes the data symbol estimates to recover the traffic data transmitted by terminal 1630. A processing system 1690 performs channel estimation for each active terminal transmitting on the uplink. Multiple terminals may transmit pilot concurrently on the uplink on their respective assigned sets of pilot subbands, where the pilot subband sets may be interlaced.

Processing systems 1690 and 1650 direct (e.g., control, coordinate, manage, etc.) operation at access point 1605 and terminal 1630, respectively. Respective processing systems 1690 and 1650 can be associated with memory units (not shown) that store program codes and data. The processing systems 1690 and 1650 can also perform computations to derive frequency and impulse response estimates for the uplink and downlink, respectively. The processing systems 1690 and 1650 may include one or more processors. A processor may be a general purpose microprocessor, a microcontroller, a Digital Signal Processor (DSP), an Application Specific Integrated Circuit (ASIC), a Field Programmable Gate Array (FPGA), digital signal processing devices (DSPDs), a Programmable Logic Device (PLD), logic circuits, discrete hardware components, or any other suitable entity that can perform calculations or other manipulations of information.

The processing system may also include one or more machine-readable media to provide data storage, including look up tables for translating identifiers to IP addresses for access terminal applications, and/or to support software applications. Software shall be construed broadly to mean instructions, programs, code, or any other electronic media content whether referred to as software, firmware, middleware, microcode, hardware description language, or otherwise. Machine-readable media may include storage integrated with a processor, such as might be the case with an ASIC. Machine-readable media may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the processing system.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof.

Figure 17:
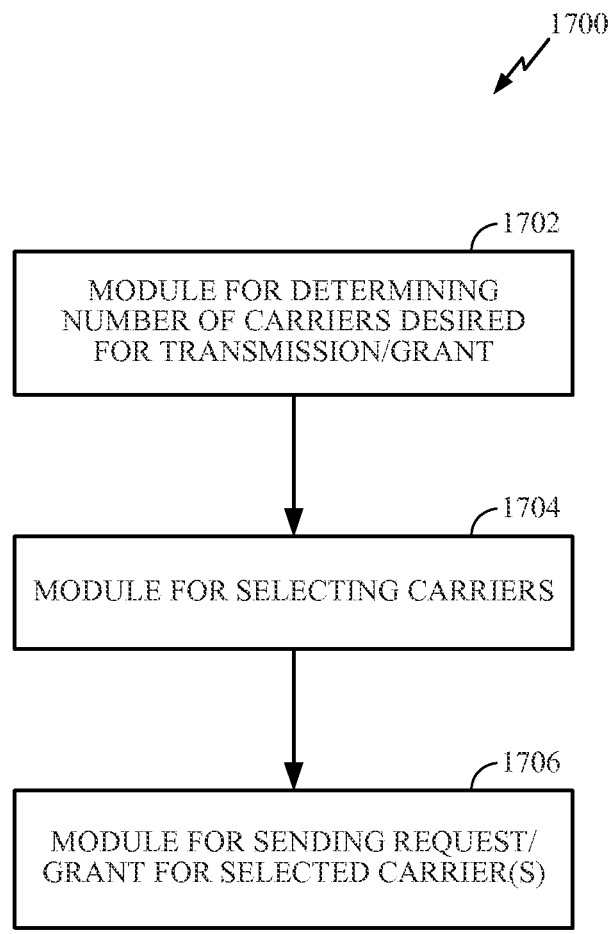
FIG. 17 is an illustration of an apparatus that facilitates wireless data communication, in accordance with various aspects.
Figure 18:
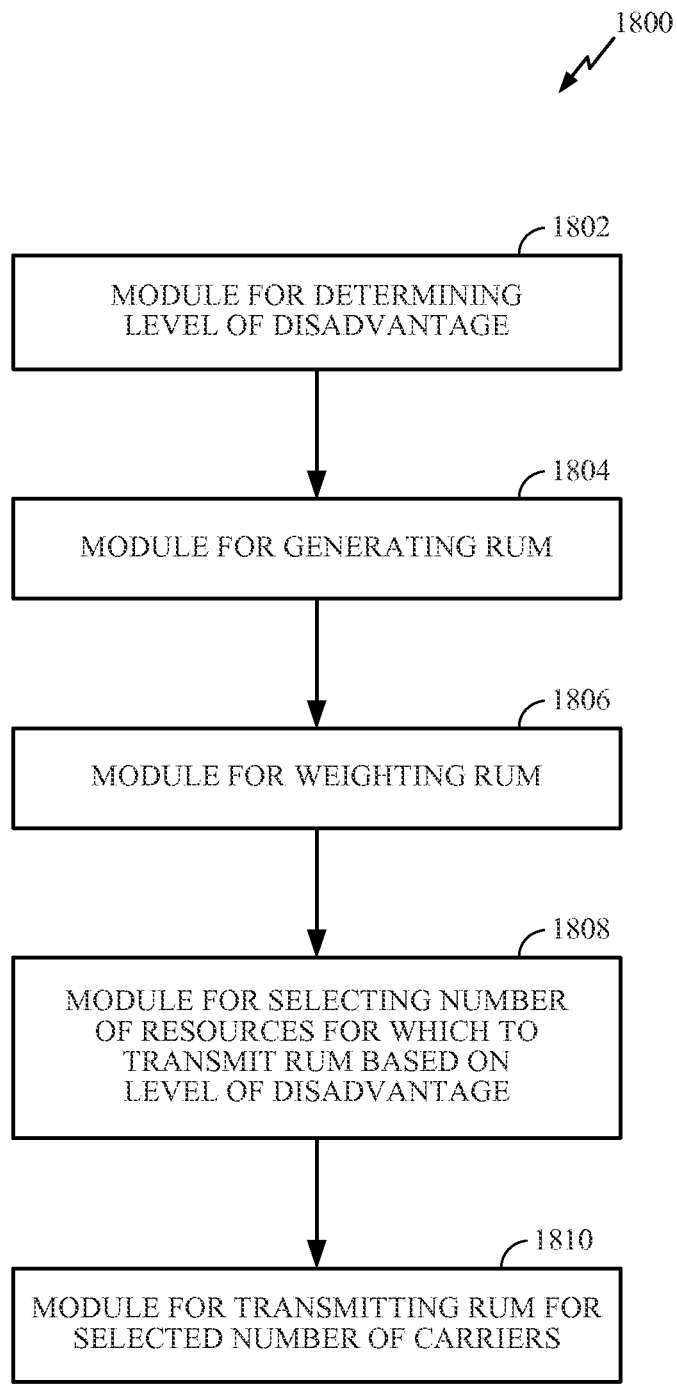
FIG. 18 is an illustration of an apparatus that facilitates wireless communication using RUMs, in accordance with one or more aspects.
Figure 19:
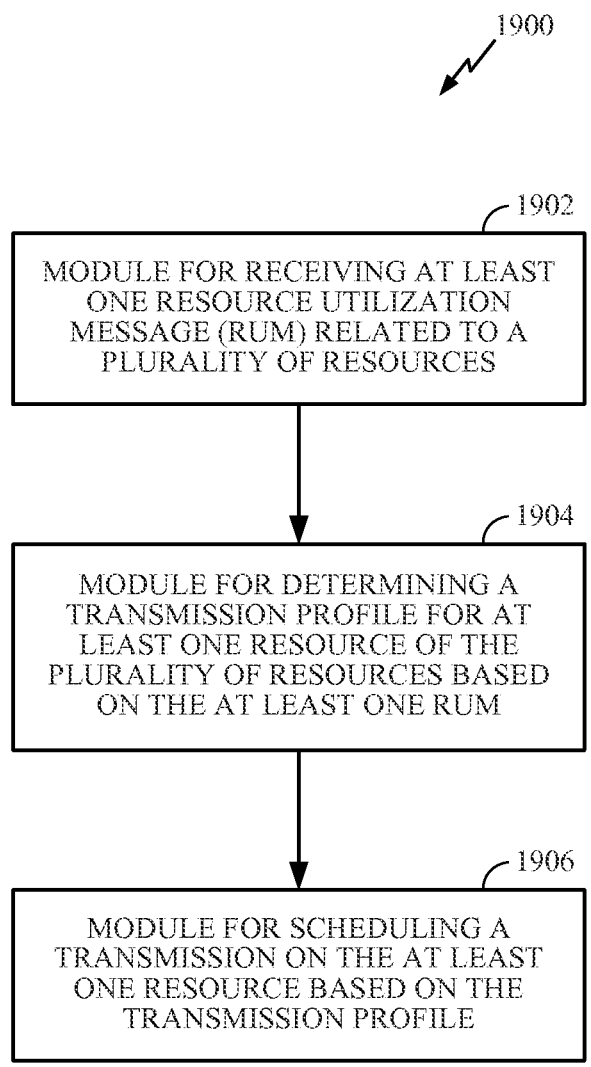
FIG. 19 is an illustration of an apparatus that facilitates scheduling a transmission based on a transmission profile.

Now turning to FIGS. 17-19 and to the various modules described with regard thereto, it will be appreciated that a module for transmitting may comprise, for example, a transmitter, and/or may be implemented in a processor, etc. Similarly, a module for receiving may comprise a receiver and/or may be implemented in a processor, etc. Additionally, a module for comparing, determining, calculating, and/or performing other analytical actions, may comprise a processor that executes instructions for performing the various and respective actions.

FIG. 17 is an illustration of a channel selection apparatus 1700 that facilitates wireless data communication, in accordance with various aspects. The channel selection apparatus 1700 is represented as a series of interrelated functional blocks that can represent functions implemented by a processor, software, or combination thereof (e.g., firmware). For example, the channel selection apparatus 1700 may provide modules for performing various acts such as are described above with regard to the various figures. The channel selection apparatus 1700 comprises a module for determining 1702 a number of carriers desired for transmission by a node such as an access terminal. When used for an access point, the module for determining 1702 may also determine a number of carriers to be granted based on the requested desired number of channels. The determination may be performed as a function of a weight associated with a node in which the apparatus is employed, a weight associated with one or more other nodes, a number of carriers available for transmission, etc. Additionally, each weight may be a function of a number of flows supported by the node associated with the weight. Additionally or alternatively, a given weight may be a function of interference experienced by the node.

The channel selection apparatus 1700 additionally comprise a module for selecting 1704 that selects carriers for which the node may transmit a request. The module for selecting 1704 additionally may evaluate a received RUM to determine which carriers are available and which are not. For instance, each RUM may comprise information associated with unavailable carriers, and the module for selecting 1754 may determine that a given carrier that is not indicated by the RUM is available. A module for sending 1706 may transmit a request for at least one carrier selected by the module for selecting 1704. It will be appreciated that the channel selection apparatus 1700 may be employed in an access point or an access terminal, and may comprise any suitable functionality to carry out the various methods described herein.

FIG. 18 is an illustration of an RUM generation apparatus 1800 that facilitates wireless communication using RUMs in accordance with one or more aspects. The RUM generation apparatus 1800 is represented as a series of interrelated functional blocks, which can represent functions implemented by a processor, software, or combination thereof (e.g., firmware). For example, the RUM generation apparatus 1800 may provide modules for performing various acts such as are described above with regard to previous figures. The RUM generation apparatus 1800 comprises a module for determining 1802 that determines a level of disadvantage for a node, and a module for generating an RUM 1804 that generates an RUM if the module for determining 1802 determines that a first predetermined threshold has been exceeded (e.g., a level of received service at a node is at or below a predetermined threshold level). Alternatively, the module for determining 1802 may also or alternatively determine if a level of interference is above a predetermined threshold level before generating the RUM. The predetermined threshold may be associated with and/or represent an IOT, a data rate, a C/I, a level of throughput, a level of spectral efficiency, a level of latency, etc. A module for selecting 1808 may select one or more resources for which to send the RUM, and the module for generating the RUM 1804 may then indicate such carriers in the RUM. A module for transmitting 1810 may then transmit the RUM.

The RUM generation apparatus 1800 may additionally comprise a module for weighting the RUM 1806, which may weight the RUM with a value indicative of a degree to which a second predetermined threshold has been exceeded, which may comprise determining a ration of an actual value of a parameter (e.g., IOT, a data rate, C/I, a level of throughput, a level of spectral efficiency, a level of latency, etc.) achieved at the node to a target, or desired, value. Additionally, the weighted value may be a quantized value.

The module for selecting resources 1808 may adjust a number of selected resources for which a subsequent RUM is transmitted based on a determination by the module for determining 1802 that the level of received service has improved in response to a previous RUM. For instance, in such a scenario, the module for selecting 1808 may reduce a number of resources indicated in a subsequent RUM in response to an improved level of received service at the node, and may increase a number of selected resources in response to a decreased or static level of received service. The resources could involve the number and identity of the carriers that are selected to be included in the RUM (e.g., in the CM of the RUM).

It will be appreciated that the RUM generation apparatus 1800 may be employed in an access point, an access terminal, etc., and may comprise any suitable functionality to carry out the various methods described herein.

FIG. 19 is an illustration of a reservation apparatus 1900 that facilitates reserving resources based on a determined condition, in accordance with one or more aspects. The reservation apparatus 1900 is represented as a series of interrelated functional blocks, which can represent functions implemented by a processor, software, or combination thereof (e.g., firmware). For example, the reservation apparatus 1900 may provide modules for performing various acts such as are described above with regard to various figures. The reservation apparatus 1900 may be employed in a first node and comprises a module 1902 for receiving at least one RUM related to a plurality of resources. The reservation apparatus 1900 may additionally comprise a module 1904 for determining a transmission profile for at least one resource of the plurality of resources based on the at least one RUM, and a module 1906 for scheduling a transmission on the at least one resource based on the transmission profile.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Moreover, in some aspects any suitable computer-program product may comprise a computer-readable medium having codes (e.g., executable by at least one computer) relating to one or more of the aspects of the disclosure. In some aspects a computer program product may comprise packaging materials.

The teachings herein may be incorporated into (e.g., implemented within or performed by) a variety of apparatuses (e.g., devices). For example, each node may be configured, or referred to in the art, as an access point (AP), NodeB, Radio Network Controller (RNC), eNodeB, Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

The various illustrative logical blocks, modules, and circuits described in connection with the aspects disclosed herein may be implemented within or performed by an integrated circuit (IC), an access terminal, or an access point. The IC may comprise a general purpose processor, a DSP, an ASIC, an FPGA or other programmable logic device, discrete gate or transistor logic, discrete hardware components, electrical components, optical components, mechanical components, or any combination thereof designed to perform the functions described herein, and may execute codes or instruction that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the present disclosure. This, the present disclosure is not intended to be limited to the aspects shown herein but is to be accorded the widest scope consistent with the principles and novel features disclosed herein.

What is claimed is:

1. A method for communicating data, comprising:
   receiving, at an access terminal in a multi-carrier communication system and from a first access point, a first resource utilization message (RUM) including a first carrier mask indicating at least one carrier to which the first RUM applies;
   receiving, at the access terminal, a second RUM from a second access point, wherein the second RUM includes a second carrier mask indicating at least one carrier to which the second RUM applies;
   creating a composite carrier mask by combining the first carrier mask and the second carrier mask with a logical OR operation;
   determining, based on the first RUM, a transmission profile for a transmission from the access terminal; and
   scheduling the transmission based on the transmission profile.

2. The method of claim 1, wherein the transmission profile is determined based on at least one of a level of interference over thermal noise (IOT), a carrier-to-interference ratio (C/I), and a level of spectral efficiency.

3. The method of claim 1, wherein the first RUM comprises a quality of service (QoS) requirement comprising at least one of a data rate, an amount of data to transmit, a level of latency, and a traffic class.

4. The method of claim 1, wherein the first RUM comprises a measure of at least one of a level of interference over thermal noise (IOT), a carrier-to-interference ratio (C/I), and a level of spectral efficiency.

5. The method of claim 1, wherein the transmission profile comprises a range of transmission power.

6. The method of claim 5, wherein the scheduling comprises transmitting at a transmission power constrained by the transmission power range.

7. The method of claim 1, wherein the scheduling comprises requesting permission from the access point to transmit to an associated node.

8. The method of claim 1, wherein the scheduling comprises communicating the transmission profile to an associated node.

9. The method of claim 1, wherein the determining the transmission profile includes selecting a carrier for inclusion in a carrier mask based on a result determined from previous RUMs.

10. The method of claim 9, wherein the result determined from the previous RUMs comprises at least one of a number of successful transmissions, a number of unsuccessful transmissions, a number of previously transmitted RUMs, and a number of RUMs previously transmitted by other nodes.

11. The method of claim 1, wherein the RUM includes a list of at least one carrier upon which the access point desires reduced interference.

12. The method of claim 1, wherein the RUM includes a weight that quantifies a degree of disadvantage that the access point is experiencing.

13. The method of claim 12, wherein the RUM is received from an access point to which the access terminal is not associated, and the method further comprises comparing the weight from the RUM to a weight of an access point with which the access terminal is associated.

14. The method of claim 12, wherein the determining the transmission profile includes deeming a carrier as available for use by the access terminal if the RUM indicates the access terminal should not transmit via the at least one carrier and the weight from the RUM is less than the weight of an access point with which the access terminal is associated.

15. The method of claim 1, further comprising:
inverting the composite carrier mask; and
requesting carrier assignment from the access point based on the inverted composite carrier mask.

16. An apparatus for communicating data, comprising:
means for receiving, at an access terminal in a multi-carrier communication system and from a first access point, a first resource utilization message (RUM) including a first carrier mask indicating at least one carrier to which the first RUM applies;
means for receiving, at the access terminal, a second RUM from a second access point, wherein the second RUM includes a second carrier mask indicating at least one carrier to which the second RUM applies;
means for creating a composite carrier mask by combining the first carrier mask and second carrier mask with a logical operation;
means for determining, based on the first RUM, a transmission profile for a transmission from the access terminal; and
means for scheduling the transmission based on the transmission profile.

17. The apparatus of claim 16, wherein the transmission profile is determined based on at least one of a level of interference over thermal noise (IOT), a carrier-to-interference ratio (C/I), and a level of spectral efficiency.

18. The apparatus of claim 16, wherein the first RUM comprises a quality of service (QoS) requirement comprising at least one of a data rate, an amount of data to transmit, a level of latency, and a traffic class.

19. The apparatus of claim 16, wherein the first RUM comprises a measure of at least one of a level of interference over thermal noise (IOT), a carrier-to-interference ratio (C/I), and a level of spectral efficiency.

20. The apparatus of claim 16, wherein the transmission profile comprises a transmission power range.

21. The apparatus of claim 20, wherein the scheduling means comprises means for transmitting on the at least one resource at a transmission power constrained by the transmission power range.

22. The apparatus of claim 16, wherein the scheduling means comprises means for requesting permission from the access point to transmit to an associated node.

23. The apparatus of claim 16, wherein the scheduling means comprises means for communicating the transmission profile to an associated node.

24. The apparatus of claim 16, wherein the determining the transmission profile includes selecting a carrier for inclusion in a carrier mask is based on a result determined from previous RUMs.

25. The apparatus of claim 24, wherein the result determined from the previous RUMs comprises at least one of a number of successful transmissions, a number of unsuccessful transmissions, a number of previously transmitted RUMs, and a number of RUMs previously transmitted by other nodes.

26. An access terminal, comprising:
an antenna; and
a processing system coupled to the antenna and configured to:
receive, via the antenna and from a first access point, a first resource utilization message (RUM) including a first carrier mask indicating at least one carrier to which the first RUM applies;
receive a second RUM from a second access point, wherein the second RUM includes a second carrier mask indicating at least one carrier to which the second RUM applies;
create a composite carrier mask by combining the first carrier mask and the second carrier mask with a logical OR operation;
determine, based on the first RUM, a transmission profile for a transmission from the access terminal; and
schedule the transmission based on the transmission profile.

27. An access terminal, comprising:
a transducer; and
a processing system coupled to the transducer and configured to:
receive, via the transducer and from a first access point, a first resource utilization message (RUM) including a first carrier mask indicating at least one carrier to which the first RUM applies;
receive a second RUM from a second access point, wherein the second RUM includes a second carrier mask indicating at least one carrier to which the second RUM applies;
create a composite carrier mask by combining the first carrier mask and the second carrier mask with a logical OR operation;
determine, based on the first RUM, a transmission profile for a transmission from the access terminal; and
schedule the transmission based on the transmission profile.

28. A computer program product for communicating data, comprising:
a non-transitory computer readable medium comprising codes executable by a processor, that when executed, cause the processor to:
receive, at an access terminal in a multi-carrier communication system and from a first access point, a first resource utilization message (RUM) including a first carrier mask indicating at least one carrier to which the first RUM applies;

receive, at the access terminal, a second RUM from a second access point, wherein the second RUM includes a second carrier mask indicating at least one carrier to which the second RUM applies;

create a composite carrier mask by combining the first carrier mask and the second carrier mask with a logical OR operation;

determine, based on the first RUM, a transmission profile for a transmission from the access terminal; and schedule the transmission based on the transmission profile.

29. An apparatus for communicating data comprising:
a processing system configured to:

receive at an access terminal in a multi-carrier communication system and from a first access point, a first resource utilization message (RUM) including a first carrier mask indicating at least one carrier to which the first RUM applies;

receive, at the access terminal, a second RUM from a second access point, wherein the second RUM includes a second carrier mask indicating at least one carrier to which the second RUM applies;

create a composite carrier mask by combining the first carrier mask and the second carrier mask with a logical OR operation;

determine, based on the first RUM, a transmission profile for a transmission from the access terminal; and schedule the transmission based on the transmission profile.

30. The apparatus of claim 29, wherein the transmission profile is determined based on at least one of a level of interference over thermal noise (IOT), a carrier-to-interference ratio (C/I), and a level of spectral efficiency.

31. The apparatus of claim 29, wherein the first RUM comprises a quality of service (QoS) comprising at least one of a data rate, an amount of data to transmit, a level of latency, and a traffic class.

32. The apparatus of claim 29, wherein the first RUM comprises a measure of at least one of a level of interference over thermal noise (IOT), a carrier-to-interference ratio (C/I), and a level of spectral efficiency.

33. The apparatus of claim 29, wherein the transmission profile comprises a transmission power range.

34. The apparatus of claim 33, wherein the processing system is further configured to transmit at a transmission power constrained by the transmission power range.

35. The apparatus of claim 29, wherein the processing system is further configured to request permission from the access point to transmit an associated node.

36. The apparatus of claim 29, wherein the processing system is further configured to communicate the transmission profile to an associated node.

37. The apparatus of claim 29, wherein the determining the transmission profile includes selecting a carrier for inclusion in a carrier mask is based on a result determined from previous RUMs.

38. The apparatus of claim 37, wherein the result determined from the previous RUMs comprises at least one of a number of successful transmissions, a number of unsuccessful transmissions, a number of previously transmitted RUMs, and a number of RUMs previously transmitted by other nodes.

* * * * *